United States Patent
Snitchler et al.

(10) Patent No.: US 9,012,779 B2
(45) Date of Patent: Apr. 21, 2015

(54) REDUCED-LOSS BUCKING BUNDLE LOW VOLTAGE CABLE

(75) Inventors: Gregory L. Snitchler, Shrewsbury, MA (US); Bruce B. Gamble, Wellesley, MA (US); Glenn C. Driscoll, Haverhill, MA (US); Timothy MacDonald, North Grafton, MA (US)

(73) Assignee: American Superconductor Corporation, Devans, MA (US)

( * ) Notice: Subject to any disclaimer, the term of this patent is extended or adjusted under 35 U.S.C. 154(b) by 396 days.

(21) Appl. No.: 13/435,197

(22) Filed: Mar. 30, 2012

(65) Prior Publication Data

US 2013/0255991 A1   Oct. 3, 2013

(51) Int. Cl.
  *H01B 7/00* (2006.01)
  *H01B 12/02* (2006.01)
  *H01B 7/30* (2006.01)

(52) U.S. Cl.
  CPC ... *H01B 12/02* (2013.01); *H01B 7/30* (2013.01); *Y02E 40/641* (2013.01)

(58) Field of Classification Search
  CPC ......... H01B 12/02; H01B 7/30; Y02E 40/641
  USPC .............................................. 174/113 C, 15.5
  See application file for complete search history.

(56) References Cited

U.S. PATENT DOCUMENTS

| | | | |
|---|---|---|---|
| 3,720,777 A * | 3/1973 | Sampson et al. | 174/15.5 |
| 4,990,492 A * | 2/1991 | Creedon et al. | 505/231 |
| 5,132,278 A * | 7/1992 | Stevens et al. | 505/231 |
| 6,255,595 B1 * | 7/2001 | Metra et al. | 174/125.1 |
| 6,275,365 B1 | 8/2001 | Kalsi et al. | |
| 6,576,843 B1 * | 6/2003 | Ashworth | 174/125.1 |
| 6,794,970 B2 | 9/2004 | Reis et al. | |
| 7,109,425 B2 * | 9/2006 | Reis et al. | 174/125.1 |
| 7,675,719 B2 | 3/2010 | Ko et al. | |
| 2008/0180202 A1 | 7/2008 | Otto et al. | |
| 2008/0190646 A1 * | 8/2008 | Folts et al. | 174/125.1 |
| 2010/0099570 A1 * | 4/2010 | Takayasu et al. | 505/163 |

OTHER PUBLICATIONS

Long Island HTS Power Cable Project Fact Sheet, Office of Electricity Delivery, and Energy Reliability, OE-1; Revision date May 16, 2008 (2 pages).

* cited by examiner

*Primary Examiner* — William H Mayo, III
*Assistant Examiner* — Hiram E Gonzalez
(74) *Attorney, Agent, or Firm* — Occhiuti & Rohlicek LLP

(57) ABSTRACT

A cable includes a plurality of bundles of insulated electrical conductors, each bundle having a first conductor, a second conductor, and a third conductor in a layered configuration. The first conductor of each bundle is connected in parallel to the first conductor of the remaining bundles, the second conductor of each bundle is connected in parallel to the second conductor of the remaining bundles, and the third conductor of each bundle is connected in parallel to the third electrical conductor of the remaining bundles. In addition, within each bundle, the first, second and third electrical conductors are configured so that a magnetic field generated in response to currents flowing within the bundle is zero as seen at a plane oriented transverse to an electrical conduction direction of the cable and located between the ends of the cable.

30 Claims, 19 Drawing Sheets

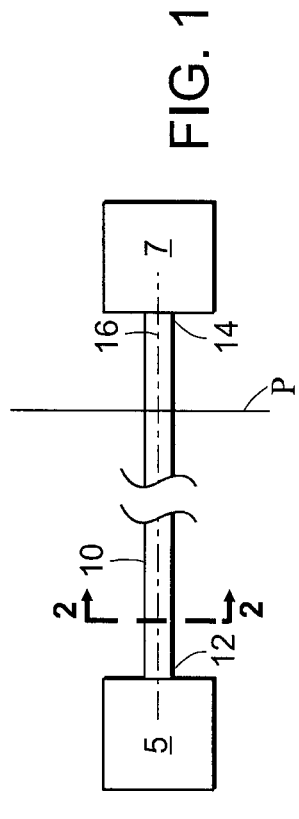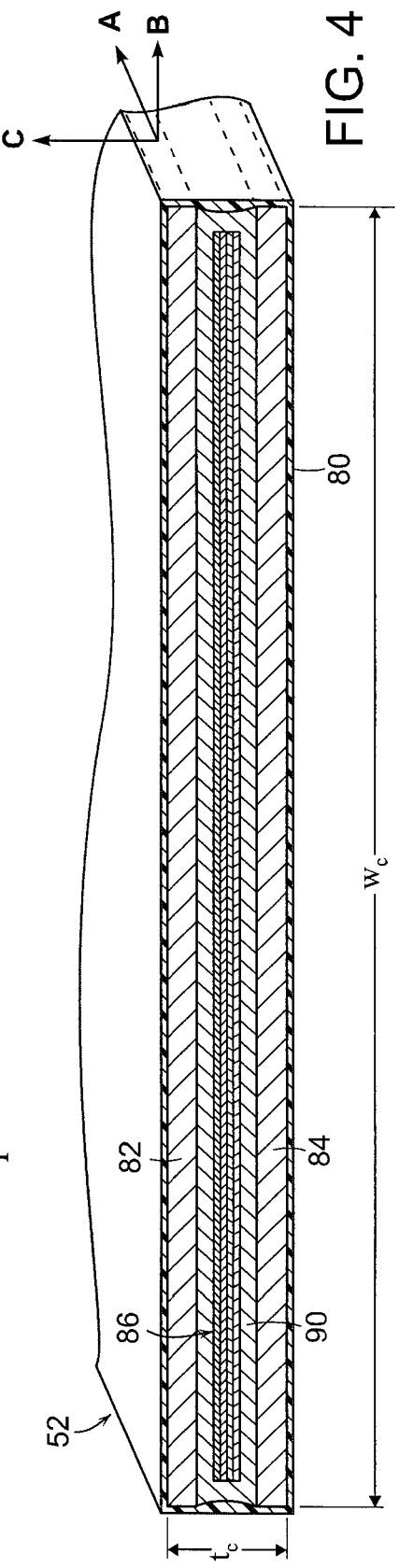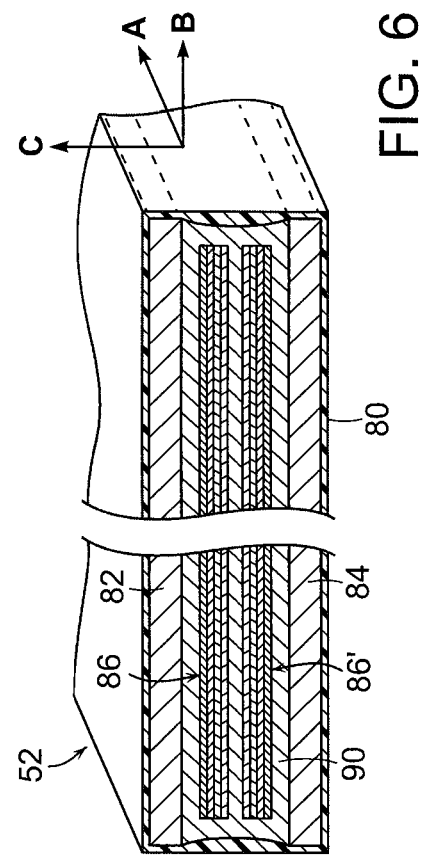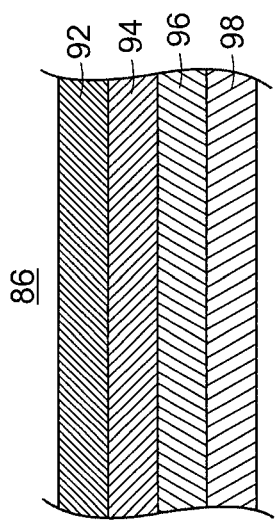

| Label | Flux Density (T) |
|---|---|
| 1 | 0.002 |
| 2 | 0.004 |
| 3 | 0.006 |
| 4 | 0.008 |
| 5 | 0.01 |
| 6 | 0.012 |

| Label | Flux Density (T) |
|---|---|
| 1 | 0.005 |
| 2 | 0.01 |
| 3 | 0.015 |
| 4 | 0.02 |
| 5 | 0.025 |

REDUCED-LOSS BUCKING BUNDLE LOW VOLTAGE CABLE

BACKGROUND OF THE INVENTION

Design and fabrication of high temperature superconducting (HTS) electrical conductors for use in power transmission cables has conventionally been focused on providing a cable having high current transmission over great distances. As power cables including HTS conductors become more commonly used in other applications, other design considerations need to be addressed. For example, in some applications, power transmission cables are required to have relatively higher flexibility and lower alternating current (AC) losses, for example resistive losses, eddy current losses, and/or superconducting hysteresis losses, than provided by conventional power transmission cables.

SUMMARY

In some aspects, an apparatus is provided that comprises a cable that includes a first end, a second end, and a plurality of bundles of electrical conductors. Each bundle has a first insulated electrical conductor, a second insulated electrical conductor, a third insulated electrical conductor, and a bundle wrap that encloses at least a portion of each of the first, second and third electrical conductors and maintains the first electrical conductor, the second electrical conductor and third electrical conductor in respective positions relative to each other within a layered configuration. The first electrical conductor of each bundle is electrically connected in parallel to the first electrical conductor of the remaining bundles, the second electrical conductor of each bundle is electrically connected in parallel to the second electrical conductor of the remaining bundles, and the third electrical conductor of each bundle is electrically connected in parallel to the third electrical conductor of the remaining bundles. Within each bundle, the first electrical conductor, the second electrical conductor and the third electrical conductor are configured so that a net magnetic field generated in response to currents flowing within the bundle is zero within a plane oriented transverse to an electrical conduction direction of the cable and located between the first and second ends of the cable.

The apparatus may include one or more of the following features: Within each bundle, the first electrical conductor, the second electrical conductor and the third electrical conductor are configured so that the sum of the currents crossing the plane is zero. Within each bundle, the phase difference between the current of the first electrical conductor and the currents of the second electrical conductor and the third electrical conductor is selected such that the sum of the current amplitudes crossing the plane at any given time is zero. Within each bundle, the first electrical conductor, the second electrical conductor and the third electrical conductor are configured so that the current of each of the first, second, and third conductor has a different current direction than the current direction of the adjacent individual conductor. The bundles are arranged within the cable such that when the cable is viewed in cross section, there is rotational symmetry of the bundles about a longitudinal axis of the cable. The cable is formed having a twist such that the bundles extend helically about a longitudinal axis of the cable from the first end to the second end. The bundle wrap comprises an insulating material. Each bundle is both fixed in position within the cable relative to the other bundles within cable as viewed in cross section, and configured to axially translate within cable relative to the other bundles.

The apparatus may also include one or more of the following additional features: Each of the first electrical conductor, the second electrical conductor and the third electrical conductor comprise a laminated superconductor wire assembly. The laminated superconductor wire assembly comprises a first support lamina; a second support lamina arranged in a layered configuration relative to the first support lamina; at least one insert disposed between the first support lamina and the second support lamina, the at least one insert including a high temperature superconductor. The laminated superconductor wire assembly comprises a first support lamina; a second support lamina arranged in a layered configuration relative to the first support lamina; a first insert disposed between the first support lamina and the second support lamina; and a second insert disposed between the first insert and the second support lamina. Each of the first insert and the second insert includes a high temperature superconductor layer and a metal substrate layer. The first insert is oriented so that the first insert high temperature super conductor layer is disposed between the first support lamina and the first insert metal substrate layer, and the second insert is oriented so that the second insert high temperature superconductor layer is disposed between the second support lamina and the second insert metal substrate layer. The laminated superconductor wire assembly comprises a first support lamina; a second support lamina arranged in a stacked configuration relative to the first support lamina; at least one metal substrate layer disposed between the first support lamina and second support lamina, a first high temperature superconducting layer disposed between the at least one metal substrate layer and the first support lamina; and a second high temperature superconducting layer disposed between the at least one metal substrate layer and the second support lamina. The cable is configured to permit a cable bend radius of less than 2 meters and operate with losses of less than 5 W/m/kA when used in 60 Hz AC operation.

The apparatus may also include one or more of the following additional features: The apparatus further comprises a power supply configured to provide alternating current at voltages of 1000 Volts or less, wherein the first end of the cable is connected to the power supply and is configured to transmit power generated by the power supply from the first end to the second end. Each bundle has an orientation defined by the ordering of the respective first, second, and third electrical conductors within the bundle along a bundle axis, and as seen in a cross-section transverse to a cable longitudinal axis, the bundles are arranged about the cable longitudinal axis such that each bundle axis extends transverse to a radius of the cable passing through a midpoint of the bundle. Each bundle within the cable has the same orientation relative to a radial line that passes through a midpoint of the bundle. There is an even number of bundles within the cable, and each bundle is evenly spaced apart from the adjacent bundle along a circumferential direction of the cable. The cable further comprises a cylindrical tube, and the bundles are supported on an outward-facing surface of the tube. The cable further comprises a cable wrap which surrounds a periphery of the cable and encloses at least a portion of each bundle, wherein the configuration of the bundles relative to the tube is maintained by the cable wrap.

The apparatus may also include one or more of the following additional features: Each bundle is assembled with at least one other bundle to form a group, and relative positions of the bundles within the group are maintained by enclosing at least a portion of the bundles within the group with a group wrap, and the cable further comprises at least two groups that are positioned symmetrically about a cable longitudinal axis as seen in a cross-sectional view of the cable. Each bundle is layered with at least one other bundle to form the group. Each bundle is assembled with at least one other bundle to form a group, and the bundles are arranged within a group in a layered configuration so that at least one bundle overlies another bundle along a group axis that passes through each respective conductor of each bundle within the group, and the orientation of each bundle within the group is the same as that of the remaining bundles within the group such that the ordering of the respective first, second, and third electrical conductors within the layered configuration of a bundle is repeated for each bundle in the group as seen along the group axis. Each bundle is assembled with at least one other bundle to form a group, and the cable further comprises at least two groups. As seen in a cross-section transverse to a cable longitudinal axis, the groups are arranged about the longitudinal axis such that at least one group has an orientation that is a translation of the orientation of another group relative to a transverse line passing through the cable longitudinal axis. The orientation of each group is defined by the ordering of the respective bundles within the group along a group axis, and by the ordering of the first, second, and third electrical conductors within the respective bundles of the group. Each bundle is grouped with at least one other bundle to form a group, and the cable further comprises several groups, each group having an orientation defined by the ordering of the respective bundles within the group along a group axis that passes through a midpoint of each of the respective bundles within the group. The groups are arranged about a cable longitudinal axis so that, as seen in a cross-section transverse to the longitudinal axis, a first group is disposed in a first quadrant of the cross section, a second group is disposed in a second quadrant of the cross section, a third group is disposed in a third quadrant of the cross section, and a fourth group is disposed in a fourth quadrant of the cross section, where the quadrants are arranged in numerical order in a clockwise direction of the cross section. The first group axis is coaxial with the second group axis, and is parallel to and spaced apart from the third group axis, the third group axis is coaxial with the fourth group axis, the second group has an orientation that is a translation of the orientation of the first group relative to a first axis transverse to a longitudinal axis of the cable, the fourth group has an orientation that is a translation of the orientation of the first group relative to a second axis transverse to a longitudinal axis of the cable, and the third group has an orientation that is a translation of the orientation of the second group relative to the second axis.

The apparatus may also include one or more of the following additional features: Each bundle is grouped with at least one other bundle to form a group, and the cable further comprises several groups, each group having an orientation defined by the ordering of the respective bundles within the group along a group axis that passes through a midpoint of each of the respective bundles within the group. The groups are arranged about a cable longitudinal axis so that, as seen in a cross-section transverse to the longitudinal axis, a first group is disposed in a first quadrant of the cross section, a second group is disposed in a second quadrant of the cross section, a third group is disposed in a third quadrant of the cross section, and a fourth group is disposed in a fourth quadrant of the cross section, where the quadrants are arranged in numerical order in a clockwise direction of the cross section. The first group axis is parallel to and spaced apart from a first transverse axis that is transverse to a longitudinal axis of the cable, the second group axis is parallel to and spaced apart from a second transverse axis that is transverse to both the longitudinal axis of the cable and the first transverse axis, the first group axis is transverse to the second group axis, the third group axis is parallel to and spaced apart from both the first transverse axis and the first group axis, the fourth group axis is parallel to and spaced apart from both the second transverse axis and the second group axis, and the third group axis is transverse to both the second group axis and the fourth group axis. The orientation of each group along its respective group axis is the same, whereby a first bundle of each group is located radially outward relative to the third bundle of each group. The arrangement of the bundles within the third group mirrors the arrangement of the bundles within the first group as seen across the second transverse axis, and the arrangement of the bundles within the second group mirrors the arrangement of the bundles within the fourth group as seen across the first transverse axis.

In some aspects, an apparatus is provided that includes a cable having a first end, a second end, and a plurality of bundles of electrical conductors. Each bundle has a first insulated electrical conductor, a second insulated electrical conductor, a third insulated electrical conductor, and a bundle wrap that encloses at least a portion of each of the first, second and third electrical conductors and maintains the first electrical conductor, the second electrical conductor and third electrical conductor in respective positions relative to each other within a layered configuration. The first electrical conductor of each bundle is electrically connected in parallel to the first electrical conductor of the remaining bundles, the second electrical conductor of each bundle is electrically connected in parallel to the second electrical conductor of the remaining bundles, and the third electrical conductor of each bundle is electrically connected in parallel to the third electrical conductor of the remaining bundles. Each bundle is grouped with at least one other bundle, and relative positions of the bundles within the group are maintained by enclosing at least a portion of the bundles within the group with a group wrap, and the cable further comprises at least two groups of bundles, and each group is positioned relative to the remaining groups such that so that a net magnetic field generated in response to currents flowing within the cable is zero as seen at a plane oriented transverse to an electrical conduction direction of the cable and located between the first and second ends of the cable.

In some aspects, an apparatus is provided that includes a cable having a first end, a second end, and a plurality of bundles of electrical conductors, each bundle having a first insulated electrical conductor, a second insulated electrical conductor, and a bundle wrap that encloses at least a portion of each of the first and second electrical conductors and maintains the first electrical conductor and the second electrical conductor in respective positions relative to each other within a layered configuration, the first electrical conductor of each bundle being electrically connected in parallel to the first electrical conductor of the remaining bundles, and the second electrical conductor of each bundle being electrically connected in parallel to the second electrical conductor of the remaining bundles. Within each bundle, the first electrical conductor and the second electrical conductor are configured so that a net magnetic field generated in response to currents flowing within the bundle is zero as seen at a plane oriented transverse to an electrical conduction direction of the cable and located between the first and second ends of the cable.

The cable disclosed herein, including the bucking bundle arrangement of electrical conductors, is relatively flexible and can be used in applications requiring a low bend radius. This is achieved by using a symmetric arrangement of bundles of conductors within the cable, which reduces the need for thick layers of insulation, and by the configuration of the insulation used to maintain the arrangement. For example, each bundle of conductors is maintained in its respective position relative to other bundles within a group by enclosing the bundle with a Teflon bundle wrap, and each group of bundles is maintained in its respective position relative to other groups by enclosing the cable with a Teflon group wrap. This use of a low-friction material such as Teflon facilitates the ability of the bundles and groups to slide axially relative to each other to achieve a longitudinally twisted cable configuration. Moreover, the conductors, bundles and groups are stacked without a lot of tension, permitting them to twist without damaging the HTS conductors. Longitudinal twisting of the cable advantageously permits a low bend radius relative to some HTS cables formed in co- or tri-axial configurations. For example, due to requirements of large amounts of insulation between respective coaxial layers, such cables typically have a bend radius of about 3.0-4.0 meters. This relatively large bend radius makes it difficult to transport and install such co- or tri-axial cables, particularly in applications where the co- or tri-axial cable is required to bend around corners. In contrast, the bucking bundle cable disclosed herein can achieve a bend radius of about 0.3 to 0.6 meters.

The cable disclosed herein, including the bucking bundle arrangement of electrical conductors, provides a relatively low-loss AC cable relative to some other cable configurations that include stacked HTS conductive tapes. For example, some conventional stacked HTS tape configurations permit relatively low bend radii, but are associated with relatively high AC losses when used in 60 Hz AC operation. Some known stacked HTS tape configurations have been shown to dissipate about 7.5 W/meter/1000 A of AC loss at 60 Hz operation. As a result, the cryogenic cooling systems required to cool such cables becomes impractically large. In contrast, the bucking bundle arrangement of electrical conductors disclosed herein includes a configuration in which the first electrical conductor, the second electrical conductor and the third electrical conductor within each three-conductor bundle are configured so that a magnetic field that is generated in response to currents flowing within the bundle is zero as seen at a plane, where the plane is oriented transverse to an electrical conduction direction of the cable and located between the first and second ends of the cable. Since each bundle has a zero magnetic field, the magnetic field that is generated in response to currents flowing within a grouping of bundles is zero as seen at the plane. In addition, since the bundles do not generate a magnetic field, the cable has minimal inductance, resulting in low AC losses. As used here, "low loss" means power dissipation of 5 W/meter/1000 A or less of AC loss at 60 Hz operation. By providing an HTS cable having low AC losses, the amount of cooling required to maintain superconductivity is correspondingly reduced, whereby cooling of such cables is practical.

As used herein, the term "bucking bundle arrangement of conductors" refers to a conductor arrangement in which the magnetic field generated in response to currents flowing within the bundle is zero as seen at the plane, due to mutual negation resulting from the use of opposed phases and/or current directions within the conductors of a bundle. This term also refers to a conductor arrangement in which the net current as seen at the plane is zero.

As used herein, the term "zero" refers to substantially or effectively zero. With respect to current, it is noted that in three-phase conduction, asymmetric loading results in zero and negative sequence currents, whereby a current imbalance of up to 10 percent of the main current can exist. For example, the sum of the currents within the conductors of a three-conductor bucking bundle is less than 10 percent of the current of any one of the conductors within the bundle. For a bundle of conductors used in a transmission cable application, this minimal sum is considered to be zero. In addition, as used herein, a magnetic field of zero refers to a flux density parallel to the C-axis of the conductors in the vicinity of a single, isolated bundle that is less than 10 mT. For a bundle of conductors used in a transmission cable application, this minimal magnetic field is considered to be zero. One of ordinary skill in the art would appreciate that when bundles are stacked in groups, the flux density in the vicinity of adjacent bundles parallel to the C-axis of the conductors would be even less than 10 mT.

The bucking bundle cable disclosed herein has benefit for applications requiring large amounts of current at low voltage, where the term low voltage refers to operating voltages up to and including 1000 V. Since the cable is operated at low voltage, less insulation is needed between individual conductors than is used in some conventional cables, between bundles and between groups. As a result, flexibility of the cable is further improved.

BRIEF DESCRIPTION OF THE FIGURES

FIG. 1 is a schematic diagram illustrating a bucking bundle cable providing an electrical connection between a power supply and a power-consuming device.

FIG. 4 is a perspective cross-sectional view of a three-ply electrical conductor.

FIG. 5 is an isolated cross-sectional view of an HTS insert of the electrical conductor of FIG. 4.

FIG. 6 is a perspective cross-sectional view of a four-ply electrical conductor.

DETAILED DESCRIPTION

Figure 2:
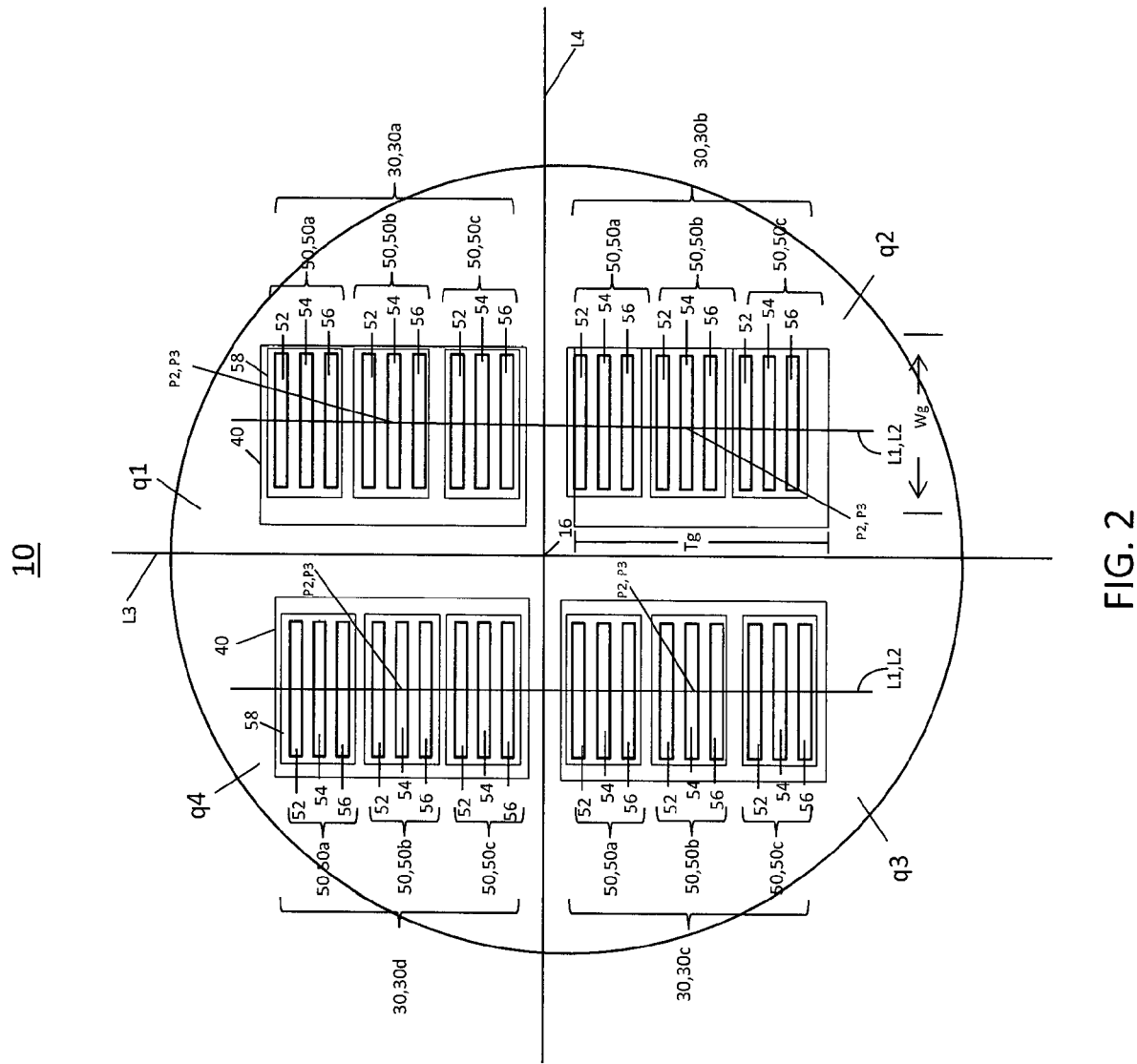
FIG. 2 is a cross-sectional view of the cable of FIG. 1 as seen along line 2-2.

Referring now to FIGS. 1 and 2, a flexible, bucking bundle power transmission cable 10 includes a first end 12, and a second end 14 opposed to the first end. The first end 12 is configured to be connected to a power supply 5, and the second end 14 is configured to be connected to a device 7 which consumes power provided by the power supply 5. The cable 10 includes a longitudinal axis 16 that extends between the first end 12 and the second end 14. The cable 10 also includes multiple individually-insulated electrical conductors 53, 54, 56 arranged in discrete bundles 50 and distributed about the longitudinal axis 16. The cable 10 is formed having a twist such that the bundles 50 extend helically about the longitudinal axis 16 from the first end 12 to the second end 14.

In the illustrated embodiment, each bundle 50 includes three insulated electrical conductors 52, 54, 56 in the form of HTS tapes that are physically grouped together in a low-loss conductor configuration, as discussed further below. In addition, several bundles 50 are arranged together in discrete groups 30, and several groups 30 are arranged about the longitudinal axis 16 of the cable 10 in a low-loss group configuration, as discussed further below. The cable 10 provides unique benefits for low voltage transmission applications. In particular, the bucking bundle conductor configuration of cable 10 permits bending at a relatively low radius of 0.6 meters or less, and also operates with relatively low loss during 60 Hz AC operation.

As used herein, the term "cable" refers to a plurality of HTS tapes arranged or assembled to form a flexible multi-tape assembly. A cable may include a single HTS bundle 50 or a plurality of HTS bundles 50 arranged to form a superstructure.

Figure 3:
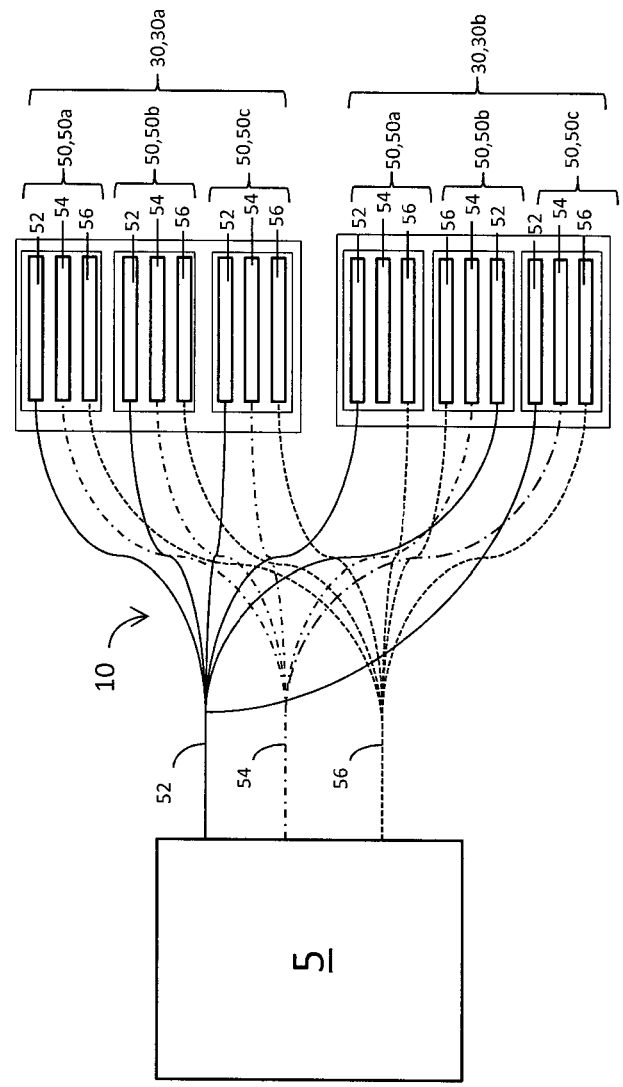
FIG. 3 is a schematic illustration of the electrical configuration of the bucking bundle cable.

Referring to FIG. 3, the cable 10 is connected to the power supply 5 such that the bundles 50 are all electrically in parallel. In particular, each first conductor 52 is electrically connected in parallel with every other first conductor 52 within the cable 10, each second conductor 54 is electrically connected in parallel with every other second conductor 54 within the cable 10, and each third conductor 56 is electrically connected in parallel with every other third conductor 56 within the cable 10. In this figure, to simplify the illustration, only two groups 30a, 30b of the several groups within the cable 10 are shown connected to the power supply 5. However, it is understood that all groups 30 are similarly electrically connected.

Referring to FIG. 4, each bundle 50 includes three insulated electrical conductors 52, 54, 56. Since each of the conductors 52, 54, 56 are structurally identical, only one conductor 52 will be described in detail. The conductor 52 is a high temperature superconducting tape having a generally rectangular cross sectional shape, and a length that is much greater in dimension than its width or thickness. For purposes of this description, the conductor 52 includes an A-axis that extends in a direction corresponding to a conductor length and is generally aligned with a longitudinal axis 16 of the cable 10. The conductor length generally corresponds to the length of the cable 10. The conductor 52 also includes a B-axis transverse to the A-axis, the B-axis extending in a direction corresponding to the conductor width $w_c$, and a C-axis transverse to both the A-axis and the B-axis, the C-axis extending in a direction corresponding to the conductor thickness $t_c$.

The conductor 52 is a laminated assembly including a first support lamina 82, a second support lamina 84, at least one HTS insert 86 disposed between the first and second support lamina 82, 84 in a layered arrangement, and a solder filler 90 that encloses the HTS insert 86 and connects the HTS insert 86 to each of the first and second support lamina 82, 84. In addition, the conductor is enclosed within a thin insulating coating 80. The laminated conductor assembly shown in FIG. 4, which includes a single HTS insert 86, is referred to as a "three-ply" conductor.

Referring to FIG. 5, the HTS insert 86 is fabricated using techniques known in the art, and includes a metal substrate 98. In some embodiments, the metal substrate 98 is formed of a ferromagnetic material. For example, the metal substrate 98 may be formed of NiW. At least a surface of the metal substrate 98 is biaxially textured to provide a crystal template for one or more buffer layers 96 and the HTS layer 94. The buffer layers 96 overlie the metal substrate 98. In some embodiments, the buffer layers 96 are made up of an electrically insulating material, though electrically conductive materials can be used. The buffer layers 96 are made up of, e.g., an inert metal, an oxide, zirconate, titanate, niobate, nitride, tantalate, aluminate, cuprate, manganate, or ruthenate of a metal or rare earth element (e.g. $Al_2O_3$, $CeO_2$, $Y_2O_3$, MgO, $Gd_2O_3$, strontium titanate, gadolinium zirconate, yttria-stabilized zirconia, AlN, $Si_3N_4$, $LaMnO_4$, $La_2Zr_2O_7$, or $La_{2-x}Ce_xZr_2O_7$). Any material, or combination of materials, that provides a suitable texture on which to grow an HTS crystal can be used. The HTS layer 94 overlies the buffer layers 96 and may be any HTS material. In some embodiments, the HTS layer includes a rare earth-alkaline earth-copper oxide, such as YBCO. A cap layer 92 overlies the HTS layer 94 and protects the HTS layer from chemical and mechanical degradation. The cap layer 92 may be sputtered Ag or other inert metal.

Referring to FIGS. 2 and 6, in the illustrated embodiment, the conductor 52 includes two HTS inserts 86, 86', and is referred to as a "four-ply" conductor. The HTS inserts 86, 86' are structurally identical, and are arranged between the lamina in such a way that the ordering of the layers of a first of the HTS inserts 86 mirrors the ordering of the layers of the second of the HTS inserts 86' as seen across an axis through the mid-thickness of the conductor and parallel to the B-axis. In particular, the HTS inserts 86, 86' are arranged so that the ordering of the layers is generally cap layer 92/HTS layer 94/buffer layer(s) 96/metal substrate 98/metal substrate 98'/buffer layer(s) 96'/HTS layer 94'/cap 92'. In other words, the HTS inserts 86, 86' are arranged so that the HTS layers 94, 94' are located outward relative to the respective metal substrates 98, 98'. By this arrangement, the respective HTS layers 94, 94' electrically shield the metal substrate layers 98, 98', a configuration that further lowers AC losses relative to a conventional tape configuration in which the ordering of insert layers is repeated, rather than mirrored, across the axis. That is, each individual conductor 52, 54, 56 is configured to be as physically symmetric as possible by placement of the HTS layers 94, 94' on both outer sides of each laminated wire conductor 52, 54, 56, where the HTS layers 94, 94' tend to shield the ferromagnetic substrates (e.g., metal substrates 98, 98') located within each conductor.

Figure 7:
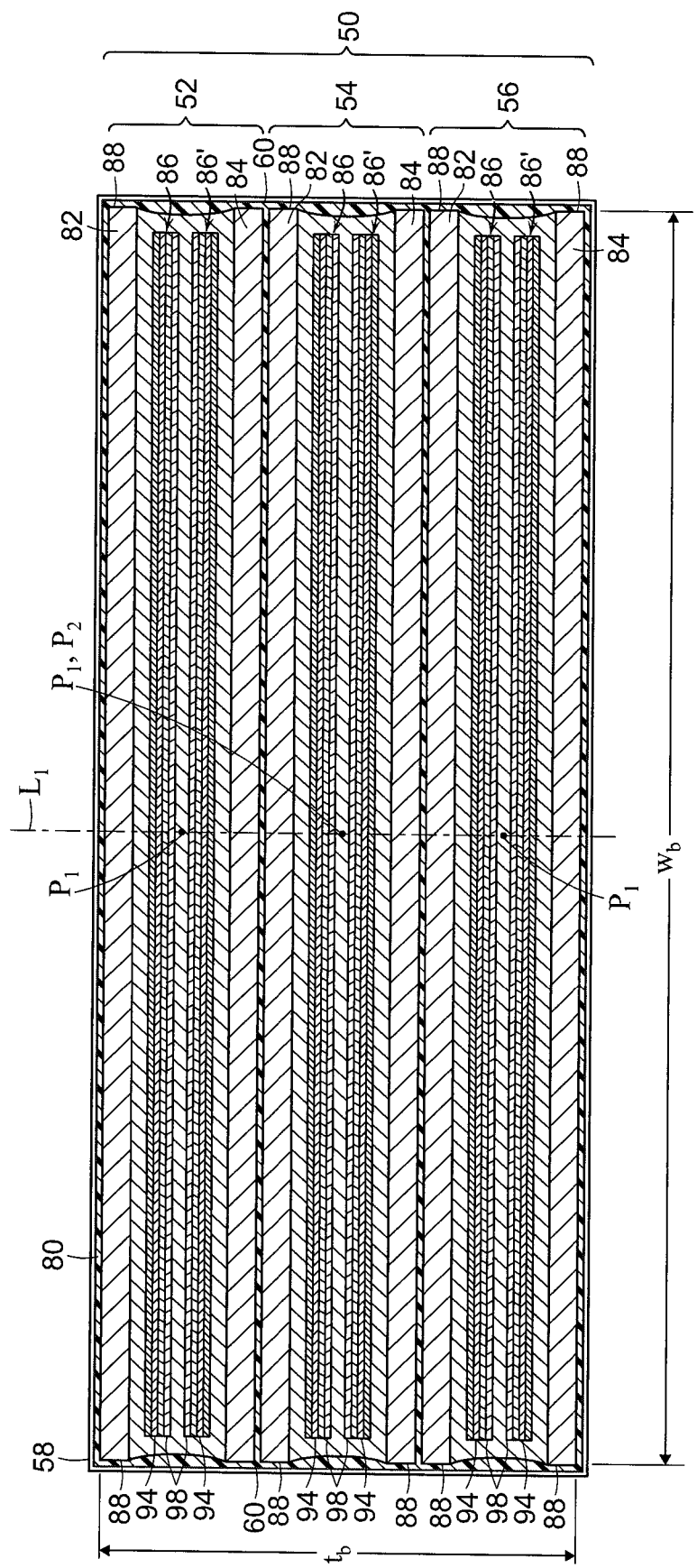
FIG. 7 is a cross-sectional view of a three-conductor bundle.

Referring to FIGS. 2 and 7, each bundle 50 includes a first conductor 52, a second conductor 54, and a third conductor 56 arranged in a layered configuration. In particular, the second conductor 54 is disposed between the first conductor 52 and the third conductor 56, and each respective conductor 52, 54, 56 within the bundle 50 has the same spatial orientation. For example, in the illustrated embodiment, the first and second support lamina 82, 84 of the first conductor 52 are parallel to the first and second support lamina 82, 84 of both the second conductor 54 and the third conductor 56. In addition, the first support lamina 82 of the second conductor 54 is adjacent to and faces the second support lamina 84 of the first conductor 52, and the second support lamina 84 of the second conductor 54 is adjacent to and faces the first support lamina 82 of the third conductor 56.

In addition, within the bundle 50, each conductor 52, 54, 56 is arranged such that a point P1 corresponding to a mid-width and mid-thickness of each respective conductor 52, 54, 56 is generally co-linear with an axis L1 extending parallel to the C-axis. As a result, the respective lateral edges 88 of the conductors 52, 54, 56 within the bundle 50 are also aligned along an axis parallel to the C-axis. This arrangement is a lower-loss configuration relative to an arrangement in which the lateral edges 88 of the layered conductors 52, 54, 56 are not aligned or are skewed, that is, aligned along an axis that is angled relative to the C-axis.

Thus, each bundle 50 has a generally rectangular cross-sectional shape having a bundle width $w_b$ that generally corresponds to a width $w_e$ of the any of the conductors 52, 54, 56, and a bundle thickness $t_b$ that generally corresponds to the sum of the thicknesses of each of the three conductors 52, 54, 56. These statements neglect added widths due to the conductor insulation 80 and bundle insulation (e.g., bundle wrap 58, discussed below), but are a reasonable approximation since relatively thin insulation layers are used. In the illustrated embodiment, due to the proportions of the conductors 52, 54, 56, each bundle 50 has a bundle width $w_b$ that is greater than the bundle thickness $t_b$. In addition, each bundle 50 includes a point P2 that corresponds to a mid-width and mid-thickness of the bundle, and thus also corresponds to a mid-width of each conductor 52, 54, 56.

The conductors 52, 54, 56 within each bundle 50 are maintained in the above-described configuration using a bundle wrap 58, which is an overwrap insulation having a low stiffness and having a low coefficient of friction insulation such as Teflon, which is a registered trademark of E. I. du Pont de Nemours and Company, Wilmington, Del., USA and has a coefficient of friction of about 0.04. In the illustrated embodiment, the bundle wrap 58 encloses the conductors 52, 54, 56 from the cable first end 12 to the cable second end 14.

Within each bundle 50, the first electrical conductor 52, the second electrical conductor 54 and the third electrical conductor 56 are configured so that a magnetic field that is generated in response to currents flowing within the bundle 50 is zero when measured in a plane transverse to an electrical conduction direction of the cable 10 and located between the first end 12 and the second end 14 of the cable 10. This is achieved by controlling the direction or phase of the current within the respective conductors 52, 54, 56.

Figure 12:
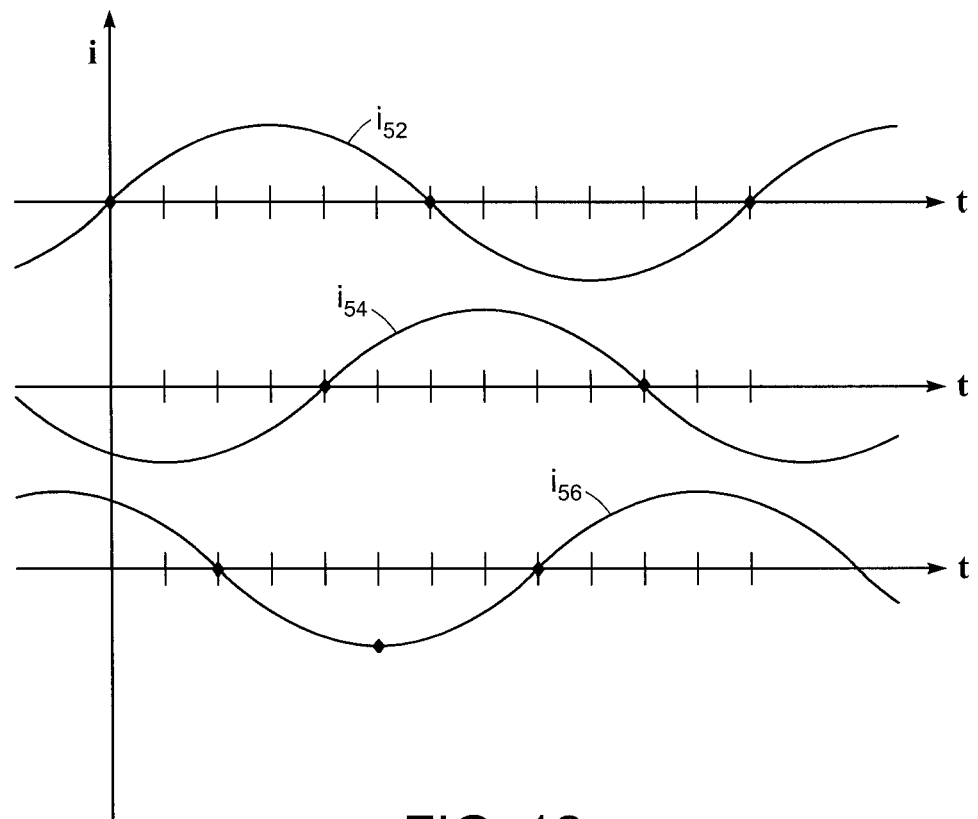
FIG. 12 is a graph of an example of the current phase of each electrical conductor within a three-conductor bundle illustrating the phase differences within respective conductors of the bundle.

Referring to FIG. 12, an example of controlling the phase of the current within the respective conductors 52, 54 56 so that a magnetic field that is generated in response to currents flowing within the bundle 50 is zero includes phase shifting the current of each conductor 52, 54, 56 120 degrees relative to the other conductors within the bundle 50. In the illustrated embodiment, the conductors 52, 54, 56 are configured to carry three phases, where the three phase currents are governed by the equations:

$I_{52}=Ipk*\sin(\omega t)$ $I_{54}=Ipk*\sin(\omega t+120 \text{ deg})$ $I_{56}=Ipk*\sin(\omega t+240 \text{ deg})$ The current and flux density limits associated with these currents can be represented by real and imaginary components. The illustrations of flux density provided in FIGS. 2a, 2b, 13a, 13b, 14a and 14b show the real flux density at a point in time where conductor 52 is at the maximum current, Ipk, and conductors 54 and 56 each have one half of the negative of the current carried in conductor 52. Thus, within a plane oriented transverse to the electrical conduction direction of the cable 10 and located between the first end 12 and the second end 14 of the cable 10, and at any time, the current amplitudes of the first, second and third conductors 52, 54, 56 sum to less than 10 percent of the current of any one of the conductors 52, 54, 56, thus ensuring that the net magnetic field generated in response to currents flowing within the bundle 50 is zero.

Figure 8:
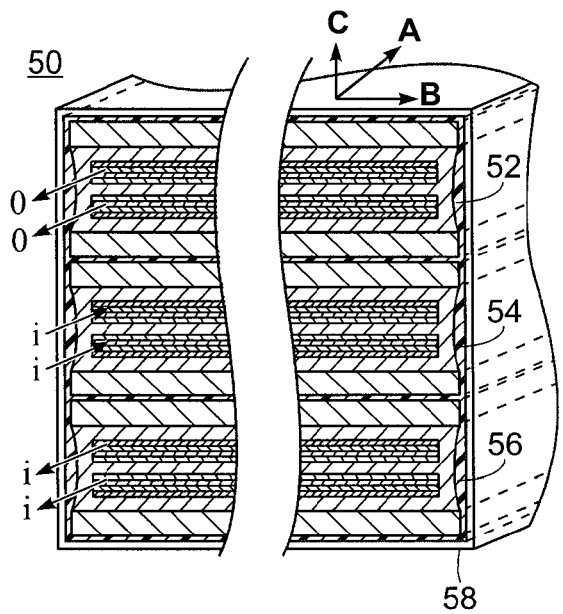
FIG. 8 is a perspective cross-sectional view of a three-conductor bundle illustrating an example of the direction of current flow within the four-ply electrical conductors of the bundle.
Figure 9:
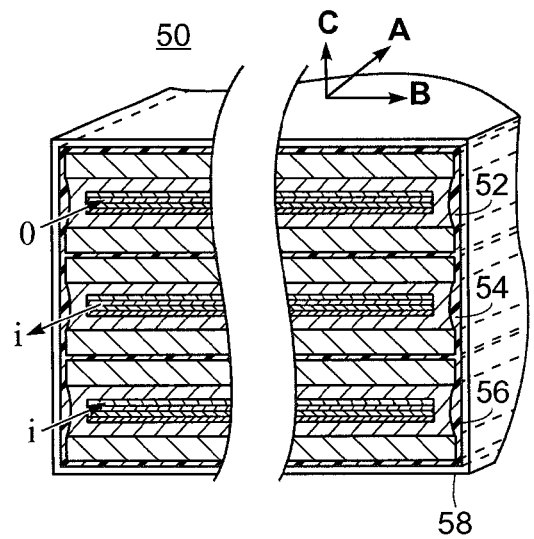
FIG. 9 is a perspective cross-sectional view of a three-conductor bundle illustrating an example of the direction of current flow within the three-ply electrical conductors of the bundle.

Referring to FIGS. 8 and 9, a first example of controlling the direction of the current within the respective conductors 52, 54, 56 so that a magnetic field that is generated in response to currents flowing within the bundle 50 is zero includes providing, for a given point in time, the first conductor 52 with a no current, providing the second conductor 54 with a current i moving in the positive direction along the A-axis, and providing the third conductor 56 with current i moving in the negative direction along the A-axis. This can be easily accomplished for four-ply conductors as shown in FIG. 8, and for three-ply conductors as shown in FIG. 9. Thus, within a plane oriented transverse to the electrical conduction direction of the cable 10 and located between the first end 12 and the second end 14 of the cable 10, the magnetic fields associated with the currents flowing in the first and second conductors 52, 54 cancel each other, whereby the net magnetic field that is generated in response to currents flowing within the bundle 50 is zero.

Figure 10:
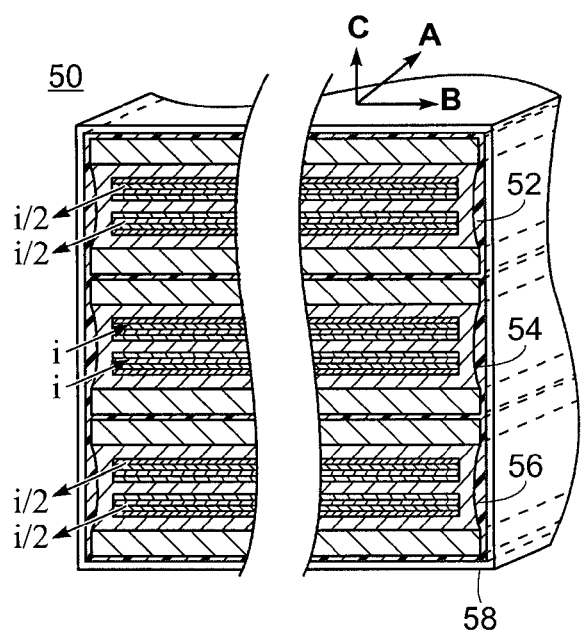
FIG. 10 is a perspective cross-sectional view of a three-conductor bundle illustrating another example of the direction of current flow within the four-ply electrical conductors of the bundle.
Figure 11:
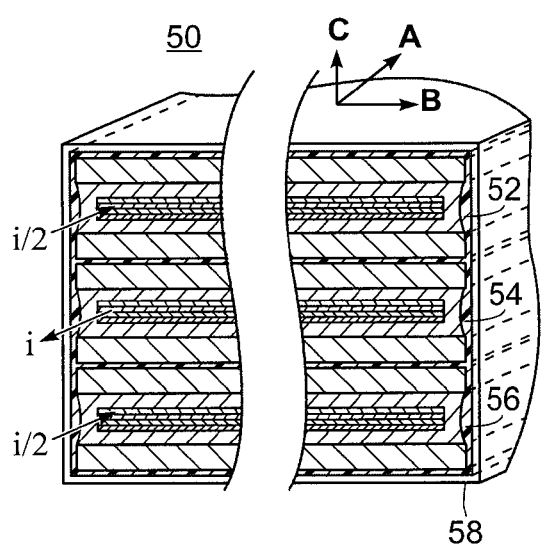
FIG. 11 is a perspective cross-sectional view of a three-conductor bundle illustrating another example of the direction of current flow within the three-ply electrical conductors of the bundle.

Referring to FIGS. 10 and 11, a second example of controlling the direction of the current within the respective conductors 52, 54, 56 so that a magnetic field that is generated in response to currents flowing within the bundle 50 is zero includes providing, at a given point in time, the first conductor 52 with a current i/2 moving in the negative direction along the A-axis, providing the second conductor with a current i moving in the positive direction along the A-axis, and providing the third conductor 56 a current i/2 moving in the negative direction along the A-axis. This can be easily accomplished for four-ply conductors, as shown in FIG. 10, and for three-ply conductors as shown in FIG. 11. Thus, within a plane oriented transverse to the electrical conduction direction of the cable 10 and located between the first end 12 and the second end 14 of the cable 10, the magnetic fields associated with the currents flowing in the first, second and third conductors 52, 54, 56 cancel each other, whereby the net magnetic field that is generated in response to currents flowing within the bundle 50 is zero.

Referring again to FIG. 2, within the cable 10, bundles 50 are arranged in discrete groups 30. In the illustrated embodiment, each group 30 includes a first bundle 50a, a second bundle 50b, and a third bundle 50c arranged in a layered configuration. In particular, the second bundle 50b is disposed between the first bundle 50a and the third bundle 50c, and each respective bundle 50a, 50b, 50c within the group 30 has the same spatial orientation. For example, in the illustrated embodiment, the conductors 52, 54, 56 of the first bundle 50a are parallel to the conductors 52, 54, 56 of both the second bundle 50b and the third bundle 50c. In addition, the first conductor 52 of the second bundle 50b is adjacent to and faces the third conductor 56 of the first bundle 50a, and the third conductor 56 of the second bundle 50b is adjacent to and faces the first conductor 52 of the third bundle 50c.

In addition, within a group 30, each bundle 50a, 50b, 50c is arranged such that the point P2, which corresponds to the mid-width and mid-thickness of each respective bundle 50a, 50b, 50c is co-linear with the axis L1. As a result, the respective lateral edges 60 of the bundles 50a, 50b, 50c within the group 30 are also aligned along an axis parallel to the C-axis. This arrangement is a lower-loss configuration relative to an arrangement in which the lateral edges 60 of the layered bundles are skewed, that is, aligned along an axis that is angled relative to the C-axis.

The bundles 50 within each group 30 are maintained in the above-described configuration using a group wrap 40. Like the bundle wrap 58, the group wrap 40 is an overwrap insulation having a low stiffness and having a low coefficient of friction such as Teflon®. In the illustrated embodiment, the group wrap 40 encloses the bundles 50 from the cable first end 12 to the cable second end 14. Note that the bundle wrap 58 and group wrap 40 are shown schematically in FIG. 2, and it is understood that the wraps 40, 58 are bound closely to the surface of the structures being wrapped. The group wrap 40 has a low yield strength, permitting the bundles 50 to be maintained in the desired arrangement during twisting of the overall cable 10. Using the group wrap 40, each bundle 50 is both fixed in position within the cable 10 relative to the other bundles 50 within the group 30 as viewed in cross section, and is configured to axially translate within the cable relative to the other bundles.

Thus, each group 30 has a generally rectangular cross-sectional shape having a group width $w_g$ that generally corresponds to a width $w_b$ of a bundle 50, and a group thickness $t_g$ that generally corresponds to the sum of the thicknesses $t_b$ of three individual bundles 50. Each group 30 includes a group center point P3 that defines a mid-width and mid-thickness of the group 30, and a group axis L2 that passes through the point P3 and is parallel to the axis L1.

As seen in FIG. 2, which illustrates a cross-section that is transverse to the cable longitudinal axis 16, the cable 10 includes four groups 30a, 30b, 30c, 30d in a circumferentially-spaced arrangement about the longitudinal axis 16. For example, a first group 30a is disposed in a first quadrant q1 of the cross section, a second group 30b is disposed in a second quadrant q2 of the cross section, a third group 30c is disposed in a third quadrant q3 of the cross section, a fourth group 30d is disposed in a fourth quadrant q4 of the cross section, where the quadrants are arranged in numerical order in a clockwise direction of the cross section.

In this embodiment, the group axis L2 of the first group 30a is parallel to and spaced apart from an axis L3 that is perpendicular to the longitudinal axis 16 and passes through the longitudinal axis 16. In addition, the group axis L2 of the first group 30a is co-axial with the group axis L2 of the second group 30b, and the orientation of the second group 30b is the same as the orientation of the first group 30a such that the arrangement of bundles 50a, 50b, 50c of the second group 30b is a translation of the arrangement of the bundles 50a, 50b, 50c of the first group 30a as seen across an axis L4 that is transverse to both the longitudinal axis 16 and the axis L3, and that passes through the longitudinal axis 16.

Similarly, the group axis L2 of the third group 30c is parallel to and spaced apart from the axis L3. In addition, the group axis L2 of the third group 30c is co-axial with the group axis L2 of the fourth group 30d. The orientation of the both third group 30c and the fourth group 30d is the same as that of the first group 30a. That is, the arrangement of bundles 50a, 50b, 50c of the third group 30c is a translation of the arrangement of the bundles 50a, 50b, 50c of the second group 30b as seen across the axis L3, and the arrangement of bundles 50a, 50b, 50c of the fourth group 30d is a translation of the arrangement of the bundles 50a, 50b, 50c of the first group 30a as seen across the axis L3. In particular, in the both the first group 30a and the fourth group 30d, the third bundle 50c is positioned at a location that is more radially inward relative to centrally-located longitudinal axis 16 than the first bundle 50a. In the both the second group 30b and the third group 30c, the first bundle 50a is positioned at a location that is more radially inward relative to centrally-located longitudinal axis 16 than the third bundle 50c.

The groups 30 within the cable 10 are maintained in the above-described configuration using a cable wrap 18. Like the bundle wrap 58, the cable wrap 18 is an overwrap insulation having a low stiffness and having a low coefficient of friction such as Teflon®. In the illustrated embodiment, the cable wrap 18 encloses the groups 30 from the cable first end 12 to the cable second end 14. The cable wrap 18 has a low yield strength, permitting the groups 30 to be maintained in the desired arrangement during twisting of the overall cable 10. Using the cable wrap 18, each group 30 is both fixed in position within the cable 10 relative to the other groups 30 within the cable 10 as viewed in cross section, and configured to axially translate within the cable relative to the other groups 30.

Figure 2A:
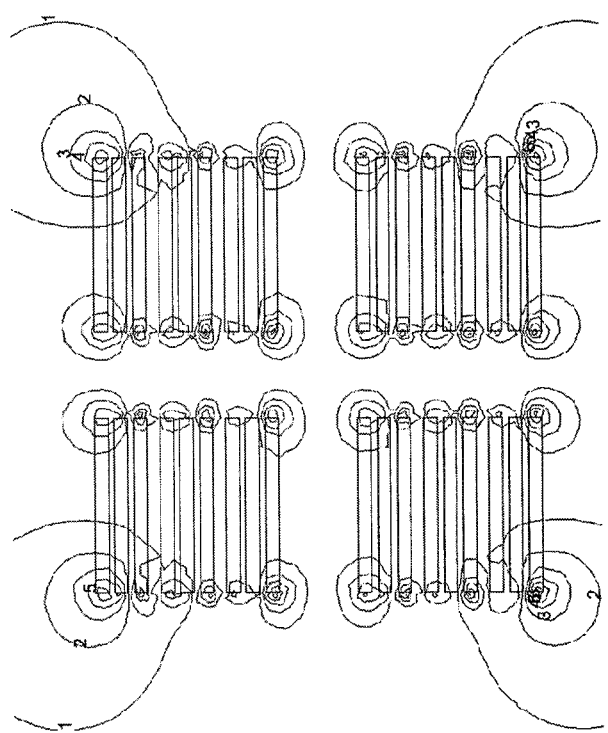
FIG. 2*a* illustrates the absolute value of the flux density in a direction parallel to the C axis for the bundle arrangement of FIG. 2.
Figure 2B:
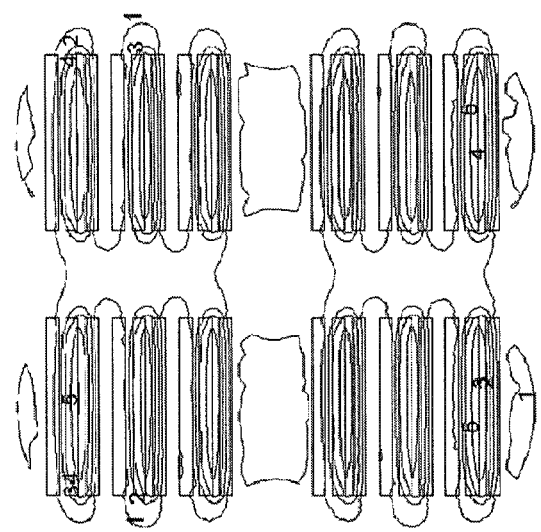
FIG. 2*b* illustrates the absolute value of the flux density in a direction perpendicular to the C axis for the bundle arrangement of FIG. 2.

Referring to FIGS. 2a and 2b, the above-described symmetries in the arrangement of the groups 30a, 30b, 30c, 30d about the longitudinal axis 16 relative to the axis L4 illustrated in FIG. 2 results in a tendency toward an equal distribution of current within the groups, whereby AC losses due to the arrangement of the groups within the cable are minimized. For example, the absolute value of the flux density parallel to the C axis for this configuration is less than 0.2 mT in the region between adjacent conductors, and is slightly higher in the regions corresponding to the conductor ends but still below 10 mT, thus can be considered to be zero across the cable 10 (FIG. 2a). The absolute value of the flux density in a direction perpendicular to the C axis for this configuration shows that most of the flux for this configuration is advantageously in the AB plane, that is, in a direction that does not result in high losses (FIG. 2b). These effects are achieved by using the shown bucking bundle arrangement of conductors 52, 54, 56 and controlling the direction or phase of the current within the respective conductors 52, 54, 56.

As previously discussed, the cable 10 is used in low voltage applications. This feature permits use of relatively thin insulation 80 to surround each conductor 52, 54, 56. Thus, in this low voltage application, the conductors 52, 54, 56 are arranged relatively close together. Because the bundle 50 is closely configured, the magnetic dipole moment is considered to be zero. As a result, the magnetic field due to current within the bundle 50 is considered to be zero at locations adjacent to the bundle.

The cable 10, and thus the conductors arranged as shown in FIG. 2, is twisted about the longitudinal axis 16 from the first end 12 to the second end, permitting the cable 10 to achieve a low bend radius. In some embodiments, the stacked arrangement of bundles 50 within groups 30, and groups 30 about the longitudinal axis 16 is assembled with little to no tension, so that the cable twist can be achieved without damaging the individual conductors 52, 54, 56.

Figure 13:
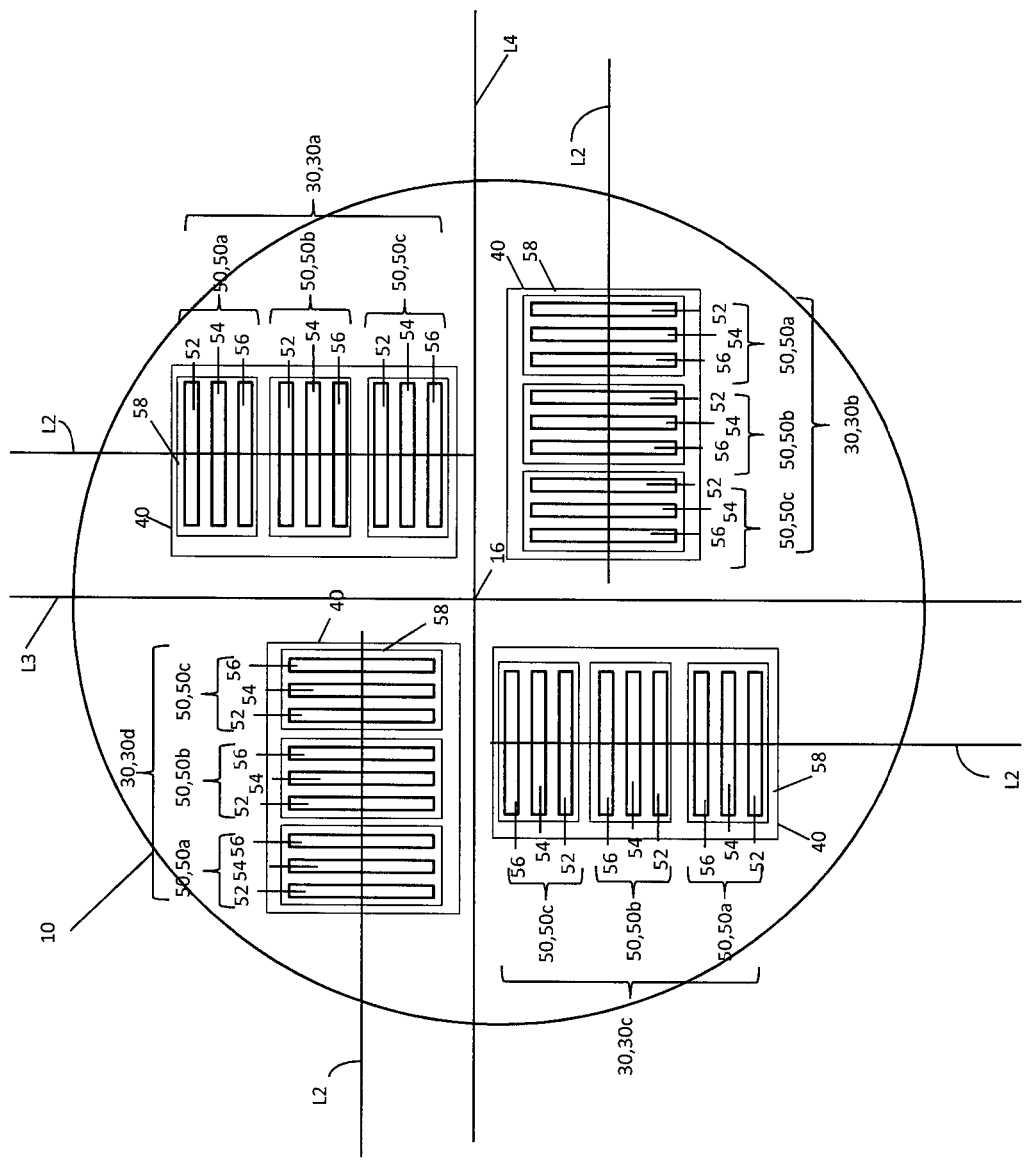
FIG. 13 is a cross-sectional view of an alternative configuration of the cable.

Referring to FIG. 13, an alternative embodiment cable 200 is similar to the cable 10 except that it includes a modified arrangement of the groups 30. In particular, cable 200 includes the four groups 30a, 30b, 30c, 30d in a circumferentially-spaced arrangement about the longitudinal axis 16 in which the first group 30a is disposed in the first quadrant q1 of the cross section, the second group 30b is disposed in the second quadrant q2 of the cross section, the third group 30c is disposed in the third quadrant q3 of the cross section, and the fourth group 30d is disposed in a fourth quadrant q4 of the cross section.

In this embodiment, the group axis L2 of the first group 30a is parallel to and spaced apart from the axis L3, and the group axis L2 of the second group 30b is parallel to and spaced apart from the axis L4. The group axis L2 of the first group 30a is transverse to the group axis L2 of the second group 30b. The group axis L2 of the third group 30c is parallel to and spaced apart from both the axis L3 and the group axis L2 of the first group 30a. The group axis L2 of the fourth group 30d is parallel to and spaced apart from both the axis L4 and the group axis L2 of the second group L2. In addition, the group axis L2 of the third group 30c is transverse to both the group axis L2 of the second group 30b and the group axis L2 of the fourth group 30d.

However, the orientation of each group 30a, 30b, 30c, 30d along its respective group axis L2 is the same, since within each group 30a, 30b, 30c, 30d, the first bundle 50a is located radially outward relative to the third bundle 50c. In addition, the arrangement of the bundles 50a, 50b, 50c within the third group 30c mirrors the arrangement of the bundles 50a, 50b, 50c within the first group 30a as seen across the axis L4, and the arrangement of the bundles 50a, 50b, 50c within the second group 30b mirrors the arrangement of the bundles 50a, 50b, 50c within the fourth group 30d as seen across the axis L3.

In the cable 200, since arrangement of the groups 30a, 30b, 30c, 30d about the longitudinal axis 16 has symmetry relative to the axes L3 and L4, and since the arrangement of bundles 50a, 50b, 50c within the groups 30 is the same, there is a tendency toward an equal distribution of current within the groups, which results in further minimized AC losses within the cable 200.

Like cable 10, since cable 200 is used in low voltage applications, relatively thin insulation 80 is used to surround each conductor 52, 54, 56. Thus, in this low voltage application, the conductors 52, 54, 56 are arranged relatively close together. Because the bundle 50 is closely configured, the magnetic dipole moment is small. As a result, the magnetic field due to current within the bundle 50 is small at locations adjacent to the bundle.

Figure 13A:
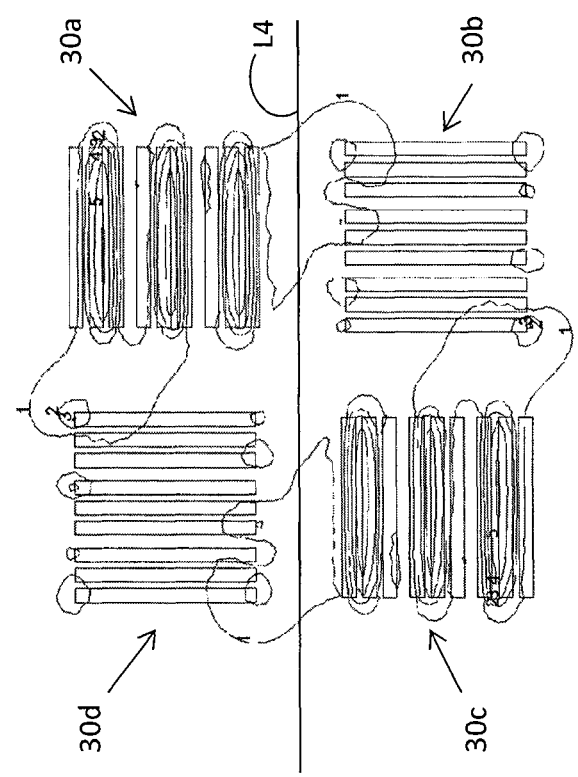
FIG. 13a illustrates the absolute value of the flux density in a direction parallel to the axis L4 (e.g. in the horizontal direction as seen in FIG. 13) for the bundle arrangement of FIG. 13.
Figure 13B:
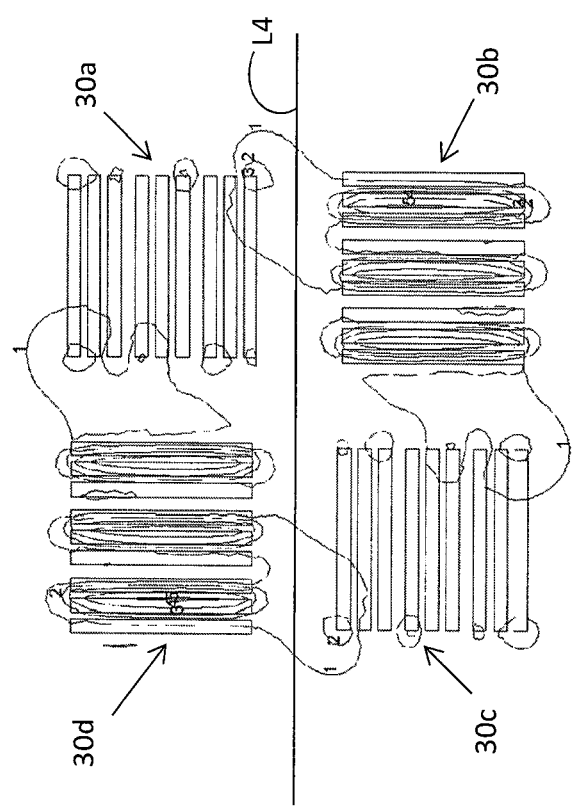
FIG. 13b illustrates the absolute value of the flux density in a direction perpendicular to the axis L4 (e.g. in the vertical direction as seen in FIG. 13) for the bundle arrangement of FIG. 13.

Referring to FIGS. 13a and 13b, this effect is illustrated for the bundle configuration of cable 200. For example, the absolute value of the flux density parallel to the L4 axis for this configuration is less than 5 mT parallel to the C-axis for the second group 30b and fourth group 30d. It is also less than 25 mT for conductors for the first group 30a and third group 30c and is perpendicular to the C-axis of the conductors in those groups (FIG. 13a). When the flux density vector component direction is plotted perpendicular to the L4 axis, the conditions are generally reversed. That is, the absolute value of the flux density in a direction perpendicular to the L4 axis for this configuration is less than 5 mT parallel to the C-axis for the first group 30a and third group 30c, and is less than 25 mT perpendicular to the C-axis for the second group 30b and the fourth group 30d (FIG. 13b). It is understood that the configuration of FIG. 13 is a less ideal configuration than FIG. 2 since the flux density parallel to the C-axis direction of the conductor is slightly higher than that of the FIG. 2 configuration. Although the flux density of this configuration is higher than for the configuration of FIG. 2, it is still considered to be effectively zero. However, the configuration of FIG. 13 provides better bending properties than that of FIG. 2.

Figure 14:
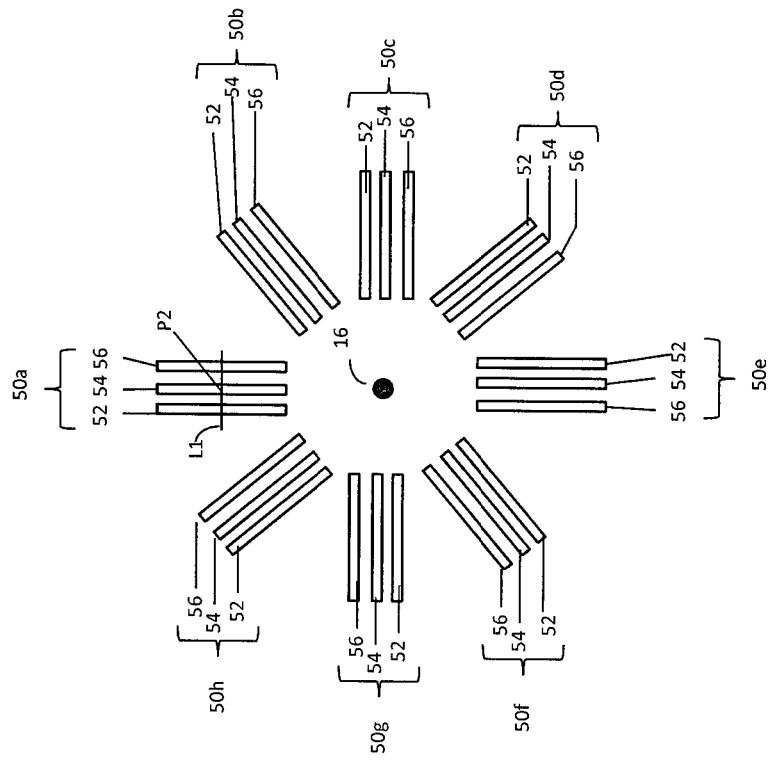
FIG. 14 is a cross-sectional view of another alternative configuration of the cable.

Referring to FIG. 14, an alternative embodiment cable 300 includes a rotationally symmetric arrangement in which plural individual bundles 50 are provided in a circumferentially spaced configuration about the longitudinal axis 16. Ideally, in this type of an arrangement, a bundle 50 occupies every peripheral location. In the illustrated embodiment, eight bundles 50a, 50b, 50c, 50d, 50e, 50f, 50g and 50h are arranged about the longitudinal axis 16.

In the cable 300, the arrangement of conductors 52, 54, 56 within the bundles 50 is the same as that described above with respect to the cable 10. As a result, within each bundle 50, the first electrical conductor 52, the second electrical conductor 54 and the third electrical conductor 56 are configured so that a net magnetic field that is generated in response to currents flowing within the bundle 50 is zero as seen at a plane oriented transverse to an electrical conduction direction of the cable 10 and located between the first end 12 and the second end 14 of the cable 10. This is achieved by controlling the direction or phase of the current within the respective conductors 52, 54, 56.

The axis L1 for each respective bundle 50 is oriented transverse to a radial line passing through the point P2, which corresponds to a mid-width and mid-thickness of each respective bundle 50. The bundles 50a, 50b, 50c, 50d, 50e, 50f, 50g and 50h are equally circumferentially spaced. In addition, the orientations of the bundles 50a, 50b, 50c, 50d, 50e, 50f, 50g and 50h are the same such that within each bundle 50, the conductors 52, 54, 56 are ordered first conductor 52/second conductor 54/third conductor 56 as viewed moving clockwise along the circumference of the cable 300. In other words, the first conductor 52 of each bundle 50 generally faces toward the third conductor 56 of the adjacent bundle 50. This arrangement of bundles 50 within the cable 300 is highly symmetric about the longitudinal axis 16, resulting in a tendency toward an equal distribution of current within the bundles 50, a whereby AC losses of the cable 300 are further reduced.

Figure 14A:
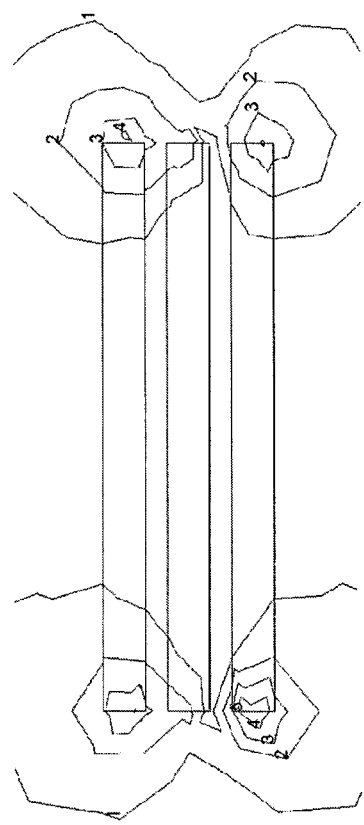
FIG. 14a illustrates the absolute value of the flux density in a direction parallel to the C axis for the bundle arrangement of FIG. 14.
Figure 14B:
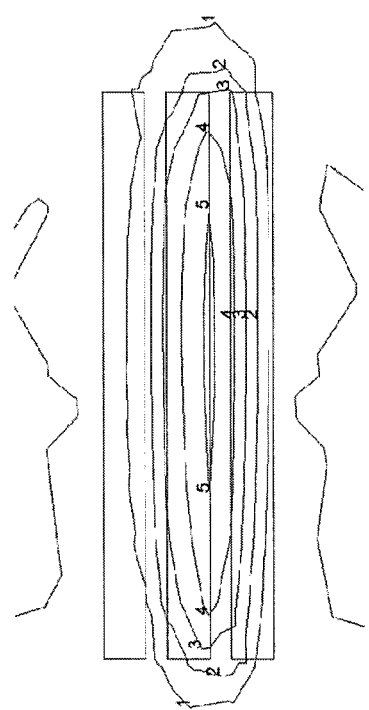
FIG. 14b illustrates the absolute value of the flux density in a direction perpendicular to the C axis for the bundle arrangement of FIG. 14.

Referring to FIGS. 14a and 14b, the above-described symmetries in the arrangement of the groups bundles 50a, 50b, 50c, 50d, 50e, 50f, 50g and 50h about the longitudinal axis 16 illustrated in FIG. 14 results in a very low AC losses. For example, the absolute value of the flux density parallel to the C axis for this configuration (FIG. 14a) is less than 0.2 mT in the region between adjacent conductors, and is slightly higher in the regions corresponding to the conductor ends but still below 10 mT, thus can be considered to be zero across the cable 300. The absolute value of the flux density in a direction perpendicular to the C axis for this configuration (FIG. 14b) shows that most of the flux for this configuration is advantageously in the AB plane, that is, in a direction that does not result in high losses. Thus, due to the improved symmetry in the arrangement of the bundles 50, the cable 300 is a lower-loss cable than cable 200 shown in FIG. 13.

Figure 15:
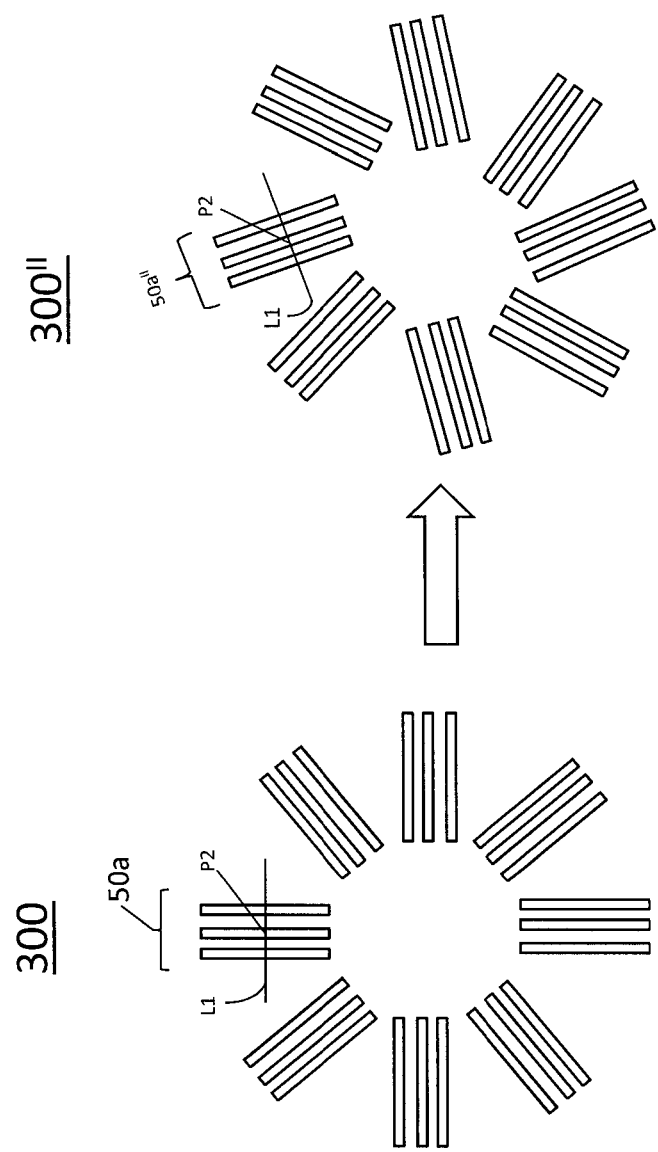
FIG. 15 is a cross-sectional view of the cable of FIG. 14 after twisting of the cable.

Referring to FIG. 15, in some cases, when the cable 300 is twisted, the bundles 50a, 50b, 50c, 50d, 50e, 50f, 50g and 50h may pivot about their respective midpoints P2 such that in the twisted cable 300", the axis L1 for each respective bundle 50 is oriented at a non-transverse angle relative to a radial line r passing through the point P2. The configuration of the twisted cable 300" has less symmetry than the untwisted cable 300, and therefore one would expect a corresponding slight increase in AC losses in the twisted cable 300" relative to the untwisted cable 300 due to the loss in symmetry. However, due to the cable twist, the twisted cable 300" has increased flexibility relative to the untwisted cable 300.

Figure 16:
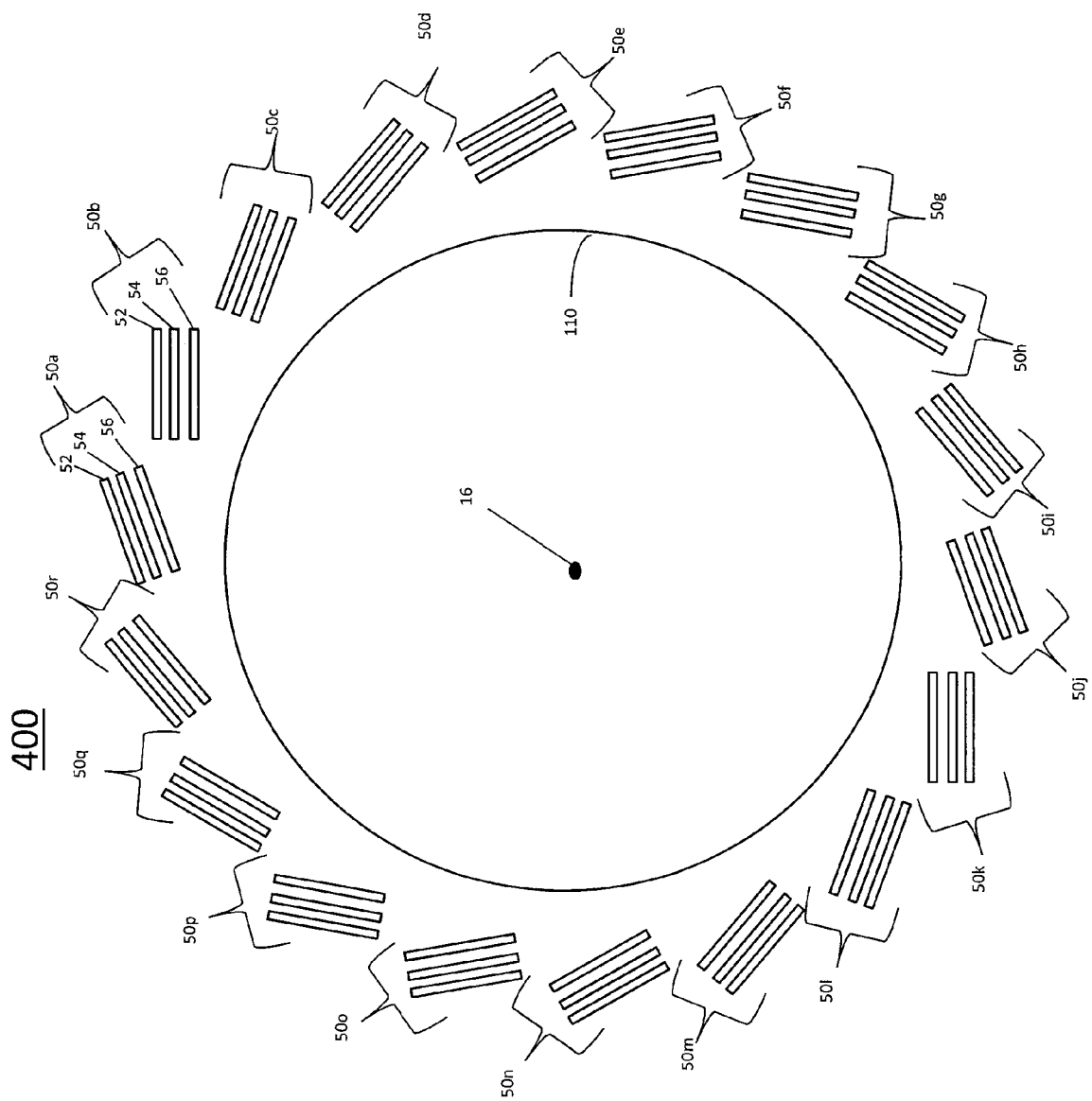
FIG. 16 is a cross-sectional view of another alternative configuration of the cable.

Referring to FIG. 16, another alternative embodiment cable 400 includes a rotationally symmetric arrangement in which plural individual bundles 50 are provided in a circumferentially spaced configuration about the longitudinal axis 16. In the illustrated example, eighteen bundles 50a, 50b, ..., 50r are oriented such that the axis L1 for each respective bundle 50 is oriented at a non-transverse angle relative to a radial line passing through the point P2, and so that lateral edges 60 of each respective bundle 50 overlap the adjacent bundles 50. In addition, in this embodiment, the bundles are supported on an outward-facing surface of a soft, conformable structure such as a hollow tube 110. For example, the tube 110 is configured to be sufficiently stiff to support the respective bundles 50a, 50b, ..., 50r in the desired configuration, while being sufficiently flexible to permit some deformation of the tube 110 during twisting of the cable 400. For example, in some embodiments the tube 110 is configured to permit an organized partial inward collapse of the tube 110 while maintaining the desired bundle configuration.

The cable 400 further comprises a cable wrap 18 which surrounds a periphery of the cable 400 and encloses at least a portion of each bundle 50a, 50b, ..., 50r, wherein the general configuration of the bundles 50a, 50b, ..., 50r relative to the tube 110 is maintained by the cable wrap 18.

In the cable 400, the arrangement of conductors 52, 54, 56 within the bundles 50 is the same as described above with respect to the cable 10. As a result, within each bundle 50, the first electrical conductor 52, the second electrical conductor 54 and the third electrical conductor 56 are configured so that a net magnetic field that is generated in response to currents flowing within the bundle 50 is zero as seen at a plane oriented transverse to an electrical conduction direction of the cable 10 and located between the first end 12 and the second end 14 of the cable 10. This is achieved by controlling the direction or phase of the current within the respective conductors 52, 54, 56.

In this embodiment, diametrically opposed bundles (for example, bundles 50a and 50j) have a generally mirrored arrangement of conductors such that the first conductor 52 of each bundle is located radially outward with respect to the third conductor 56 of each bundle, particularly when the angle between the axis L1 and a radius passing through point P2 is small. Thus, the arrangement of bundles 50 within the cable 400 is highly symmetric about the longitudinal axis 16, resulting in a tendency toward an equal distribution of current within the bundles 50, whereby AC losses of the cable 400 are further reduced. By keeping overlap of adjacent bundles 50 minimal, cross-talk and thus the losses associated with cross-talk, are also minimal. Moreover, the disadvantages resulting from the minimal bundle overlap are compensated for in increased cable flexibility.

Figure 17A:
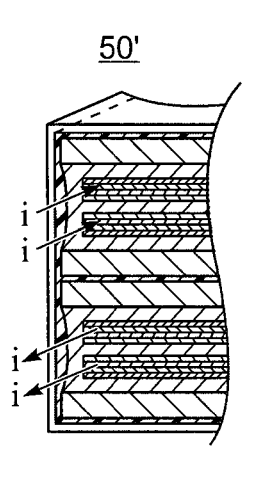
FIG. 17a is a perspective cross-sectional view of a two-conductor bundle illustrating an example of the direction of current flow within the four-ply electrical conductors of the bundle.
Figure 17B:
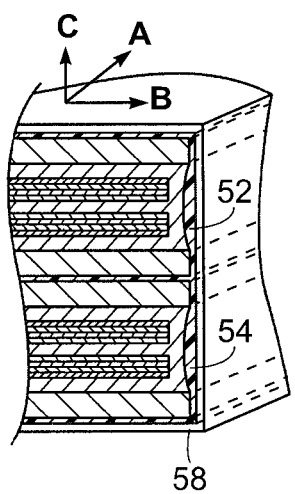
FIG. 17b is a perspective cross-sectional view of a two-conductor bundle illustrating an example of the direction of current flow within the three-ply electrical conductors of the bundle.

Referring to FIGS. 17a and 17b, although the previous embodiments illustrated several exemplary configurations of a flexible, three-phase AC power transmission cable, the cable 10, 200, 300, 400 is not limited to a three-phase cable. For example, direct current (DC) cable configurations and single phase AC cables in which each bundle 50'includes only a first conductor 52 and a second conductor 54 can be electrically connected as a "go and return." For example, as seen in FIGS. 17a and 17b, the direction of the current within the respective conductors 52, 54 is controlled so that a net magnetic field that is generated in response to currents flowing within the bundle 50' is zero by providing, at a given point in time, the first conductor 52 with a current i moving in the positive direction along the A-axis, and providing the second conductor 54 with a current i moving in the negative direction along the A-axis. This can be easily accomplished for four-ply conductors as shown in FIG. 17a, and for three-ply conductors as shown in FIG. 17b.

Figure 18:
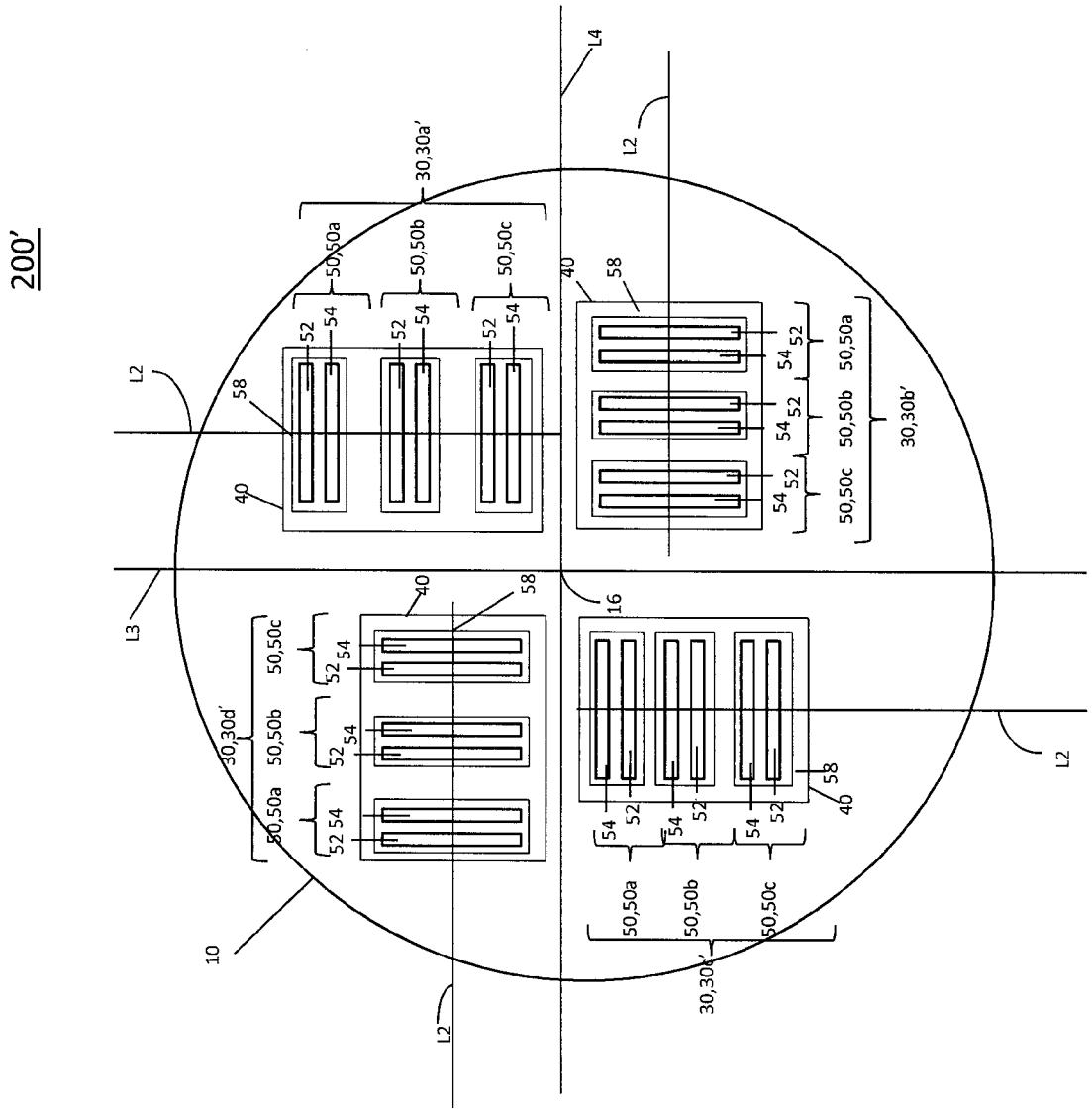
FIG. 18 is a cross-sectional view of another alternative configuration of the cable.
Figure 19:
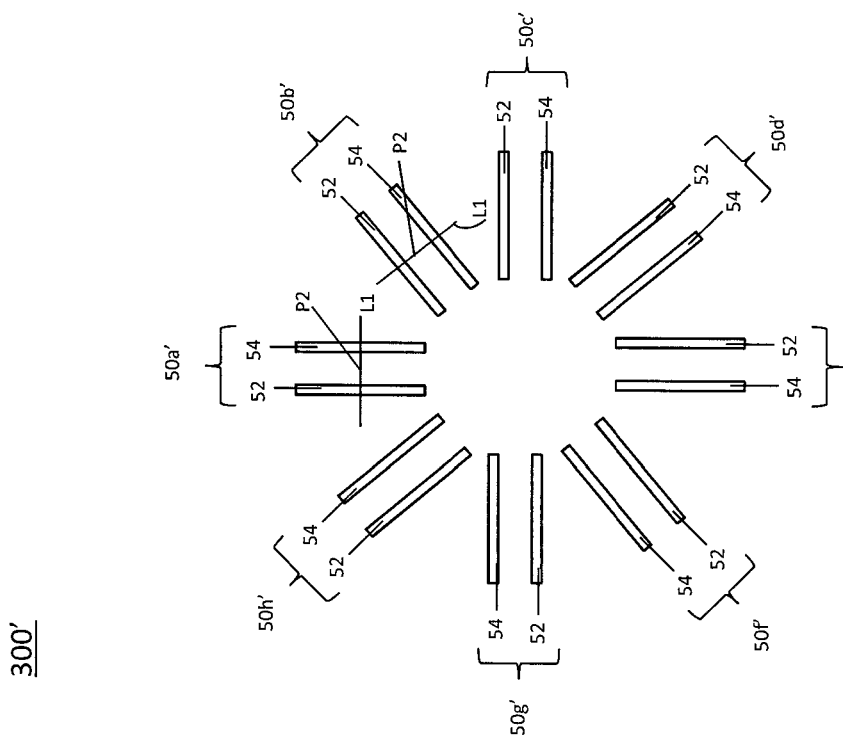
FIG. 19 is a cross-sectional view of another alternative configuration of the cable.
Figure 20:
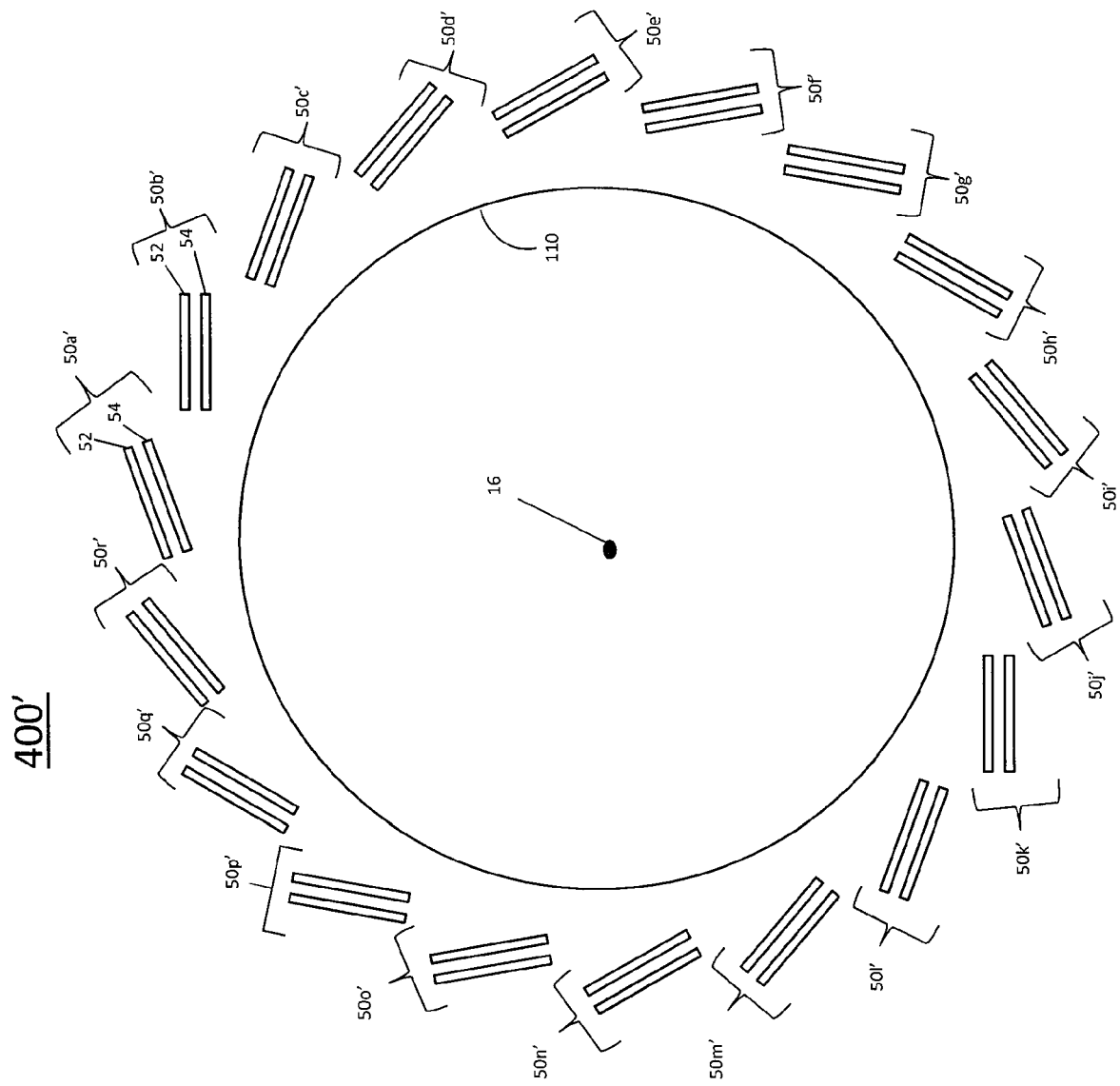
FIG. 20 is a cross-sectional view of another alternative configuration of the cable.

Referring to FIGS. 18-20, the DC and single phase AC cable configurations containing both a "go and return" can be arranged to have beneficial symmetries as described above for three-phase AC cables. For example, FIG. 18 illustrates a cable 200' that is the DC counterpart for the arrangement of bundles 50 and groups 30 described above with respect to cable 200 as shown in FIG. 13. Similarly, FIG. 19 illustrates a cable 300' that is the DC counterpart for the arrangement of bundles 50 described above with respect to cable 300 as shown in FIG. 14, and FIG. 20 illustrates a cable 400' that is the DC counterpart for the arrangement of bundles 50 described above with respect to cable 400 as shown in FIG. 16.

The cable can include bundle and group stacking arrangements other than the exemplary embodiments described above that maintain the same bucking bundle cable bend behavior. The fundamental principal is that the three-phase bundles 50 of individual HTS conductive tapes are layered such a way that the net dipole moment is minimal within the bundle. In addition, the bundles are layered in groups, which are in turn symmetrically arranged about a longitudinal axis of the cable so as to promote equal current distribution within the groups, further minimizing cable losses.

Although the conductors 52, 54, 56 described above are laminated HTS tapes, it is understood that various different types of HTS conductors may be utilized to produce the bucking bundle cables of the present invention. For example, the HTS conductor may be formed as a multi-filamentary composite in a silver matrix, or other suitable configuration.

Although the cable embodiments described herein include three bundles 50a, 50b, 50c in each group 30, a group 30 is not limited to having three bundles 50. The number of bundles 50 provided in each group 30 is determined by the requirements of the specific application, and as a result each group may include two bundles 50, or may include more than three bundles 50.

Although the cable embodiments described herein include groups 30 in which every bundle 30 within the group 30 has the same spatial orientation, the groups 30 are not limited to this configuration. For example, a group 30 may include four bundles 50a, 50b, 50c, 50d, in which the bundles have alternating orientations such that the respective conductors are arranged in the following order: 52a/54a/56a/56b/54b/52b/52c/54c/56c/56d/54d/52d.

Selected illustrative embodiments of the flexible, low-loss bucking bundle cable are described above in some detail. While this working example of the present invention has been described above, the present invention is not limited to the working example described above, but various design alterations may be carried out without departing from the present invention as set forth in the claims.

In addition, it should be understood that only structures considered necessary for clarifying the present invention have been described herein. Other conventional structures, and those of ancillary and auxiliary components of the system, are assumed to be known and understood by those skilled in the art.

What is claimed is:

1. An apparatus comprising a cable that includes a first end, a second end, and a plurality of bundles of electrical conductors,
    each bundle having
        a first insulated electrical conductor,
        a second insulated electrical conductor,
        a third insulated electrical conductor, and
        a bundle wrap that encloses at least a portion of each of the first, second and third electrical conductors and maintains the first electrical conductor, the second electrical conductor and third electrical conductor in respective positions relative to each other within a layered configuration,
    the first electrical conductor of each bundle being electrically connected in parallel to the first electrical conductor of the remaining bundles,
    the second electrical conductor of each bundle being electrically connected in parallel to the second electrical conductor of the remaining bundles, and
    the third electrical conductor of each bundle being electrically connected in parallel to the third electrical conductor of the remaining bundles,
    wherein
        within each bundle, the first electrical conductor, the second electrical conductor and the third electrical conductor are configured so that a net magnetic field generated in response to currents flowing within the bundle is zero within a plane oriented transverse to an electrical conduction direction of the cable and located between the first and second ends of the cable.

2. The apparatus of claim 1, wherein within each bundle, the first electrical conductor, the second electrical conductor and the third electrical conductor are configured so that the sum of the currents crossing the plane is zero.

3. The apparatus of claim 1, wherein within each bundle, the phase difference between the current of the first electrical conductor and the currents of the second electrical conductor and the third electrical conductor is selected such that the sum of the current amplitudes crossing the plane at any given time is zero.

4. The apparatus of claim 1, wherein within each bundle, the first electrical conductor, the second electrical conductor and the third electrical conductor are configured so that the current of each of the first, second, and third conductor has a different current direction than the current direction of the adjacent individual conductor.

5. The apparatus of claim 1, wherein the bundles are arranged within the cable such that when the cable is viewed in cross section, there is rotational symmetry of the bundles about a longitudinal axis of the cable.

6. The apparatus of claim 1, wherein the cable is formed having a twist such that the bundles extend helically about a longitudinal axis of the cable from the first end to the second end.

7. The apparatus of claim 1, wherein the bundle wrap comprises an insulating material.

8. The apparatus of claim 1, wherein each bundle is both
    fixed in position within the cable relative to the other bundles within cable as viewed in cross section, and
    configured to axially translate within cable relative to the other bundles.

9. The apparatus of claim 1, wherein each of the first electrical conductor, the second electrical conductor and the third electrical conductor comprise a laminated superconductor wire assembly.

10. The apparatus of claim 9, wherein the laminated superconductor wire assembly comprises
    a first support lamina;
    a second support lamina arranged in a layered configuration relative to the first support lamina;
    at least one insert disposed between the first support lamina and the second support lamina, the at least one insert including a high temperature superconductor.

11. The apparatus of claim 9, wherein the laminated superconductor wire assembly comprises
    a first support lamina;
    a second support lamina arranged in a layered configuration relative to the first support lamina;
    a first insert disposed between the first support lamina and the second support lamina; and
    a second insert disposed between the first insert and the second support lamina, wherein
    each of the first insert and the second insert comprising a high temperature superconductor layer and a metal substrate layer,
    the first insert is oriented so that the first insert high temperature super conductor layer is disposed between the first support lamina and the first insert metal substrate layer, and
    the second insert is oriented so that the second insert high temperature superconductor layer is disposed between the second support lamina and the second insert metal substrate layer.

12. The apparatus of claim 9, wherein the laminated superconductor wire assembly comprises
    a first support lamina;
    a second support lamina arranged in a stacked configuration relative to the first support lamina;
    at least one metal substrate layer disposed between the first support lamina and second support lamina,
    a first high temperature superconducting layer disposed between the at least one metal substrate layer and the first support lamina; and
    a second high temperature superconducting layer disposed between the at least one metal substrate layer and the second support lamina.

13. The apparatus of claim 1, wherein the cable is configured to permit a cable bend radius of less than 2 meters and operate with losses of less than 5 W/m/kA when used in 60 Hz AC operation.

14. The apparatus of claim 1, wherein the apparatus further comprises a power supply configured to provide alternating current at voltages of 1000 Volts or less,
wherein the first end of the cable is connected to the power supply and is configured to transmit power generated by the power supply from the first end to the second end.

15. The apparatus of claim 1, wherein each bundle has an orientation defined by the ordering of the respective first, second, and third electrical conductors within the bundle along a bundle axis, and
as seen in a cross-section transverse to a cable longitudinal axis, the bundles are arranged about the cable longitudinal axis such that each bundle axis extends transverse to a radius of the cable passing through a midpoint of the bundle.

16. The apparatus of claim 1, wherein each bundle within the cable has the same orientation relative to a radial line that passes through a midpoint of the bundle.

17. The apparatus of claim 1, wherein there is an even number of bundles within the cable, and each bundle is evenly spaced apart from the adjacent bundle along a circumferential direction of the cable.

18. The apparatus of claim 1, wherein the cable further comprises a cylindrical tube, and the bundles are supported on an outward-facing surface of the tube.

19. The apparatus of claim 1, wherein the cable further comprises a cable wrap which surrounds a periphery of the cable and encloses at least a portion of each bundle, wherein the configuration of the bundles relative to the tube is maintained by the cable wrap.

20. The apparatus of claim 1, wherein each bundle is assembled with at least one other bundle to form a group, and relative positions of the bundles within the group are maintained by enclosing at least a portion of the bundles within the group with a group wrap, and
the cable further comprises at least two groups that are positioned symmetrically about a cable longitudinal axis as seen in a cross-sectional view of the cable.

21. The apparatus of claim 20, wherein each bundle is layered with at least one other bundle to form the group.

22. The apparatus of claim 1, wherein each bundle is assembled with at least one other bundle to form a group, and the bundles are arranged within a group in a layered configuration so that
at least one bundle overlies another bundle along a group axis that passes through each respective conductor of each bundle within the group, and
the orientation of each bundle within the group is the same as that of the remaining bundles within the group such that the ordering of the respective first, second, and third electrical conductors within the layered configuration of a bundle is repeated for each bundle in the group as seen along the group axis.

23. The apparatus of claim 1, wherein
each bundle is assembled with at least one other bundle to form a group,
the cable further comprises at least two groups,
as seen in a cross-section transverse to a cable longitudinal axis, the groups are arranged about the longitudinal axis such that at least one group has an orientation that is a translation of the orientation of another group relative to a transverse line passing through the cable longitudinal axis.

24. The apparatus of claim 23, where the orientation of each group is defined by the ordering of the respective bundles within the group along a group axis, and by the ordering of the first, second, and third electrical conductors within the respective bundles of the group.

25. The apparatus of claim 1 wherein each bundle is grouped with at least one other bundle to form a group, and the cable further comprises several groups, each group having an orientation defined by the ordering of the respective bundles within the group along a group axis that passes through a midpoint of each of the respective bundles within the group, the groups arranged about a cable longitudinal axis so that, as seen in a cross-section transverse to the longitudinal axis,
a first group is disposed in a first quadrant of the cross section,
a second group is disposed in a second quadrant of the cross section,
a third group is disposed in a third quadrant of the cross section,
a fourth group is disposed in a fourth quadrant of the cross section, where the quadrants are arranged in numerical order in a clockwise direction of the cross section,
the first group axis is coaxial with the second group axis, and is parallel to and spaced apart from the third group axis,
the third group axis is coaxial with the fourth group axis,
the second group has an orientation that is a translation of the orientation of the first group relative to a first axis transverse to a longitudinal axis of the cable,
the fourth group has an orientation that is a translation of the orientation of the first group relative to a second axis transverse to a longitudinal axis of the cable, and
the third group has an orientation that is a translation of the orientation of the second group relative to the second axis.

26. The apparatus of claim 1 wherein each bundle is grouped with at least one other bundle to form a group, and the cable further comprises several groups, each group having an orientation defined by the ordering of the respective bundles within the group along a group axis that passes through a midpoint of each of the respective bundles within the group, the groups arranged about a cable longitudinal axis so that, as seen in a cross-section transverse to the longitudinal axis,
a first group is disposed in a first quadrant of the cross section,
a second group is disposed in a second quadrant of the cross section,
a third group is disposed in a third quadrant of the cross section,
a fourth group is disposed in a fourth quadrant of the cross section, where the quadrants are arranged in numerical order in a clockwise direction of the cross section,
the first group axis is parallel to and spaced apart from a first transverse axis that is transverse to a longitudinal axis of the cable,
the second group axis is parallel to and spaced apart from a second transverse axis that is transverse to both the longitudinal axis of the cable and the first transverse axis,
the first group axis is transverse to the second group axis,
the third group axis is parallel to and spaced apart from both the first transverse axis and the first group axis,
the fourth group axis is parallel to and spaced apart from both the second transverse axis and the second group axis, and the third group axis is transverse to both the second group axis and the fourth group axis.

27. The apparatus of claim 26, wherein the orientation of each group along its respective group axis is the same, whereby a first bundle of each group is located radially outward relative to the third bundle of each group.

28. The apparatus of claim 26, wherein the arrangement of the bundles within the third group mirrors the arrangement of the bundles within the first group as seen across the second transverse axis, and the arrangement of the bundles within the second group mirrors the arrangement of the bundles within the fourth group as seen across the first transverse axis.

29. An apparatus comprising a cable that includes a first end, a second end, and a plurality of bundles of electrical conductors,
    each bundle having
        a first insulated electrical conductor,
        a second insulated electrical conductor,
        a third insulated electrical conductor, and
        a bundle wrap that encloses at least a portion of each of the first, second and third electrical conductors and maintains the first electrical conductor, the second electrical conductor and third electrical conductor in respective positions relative to each other within a layered configuration,
    the first electrical conductor of each bundle being electrically connected in parallel to the first electrical conductor of the remaining bundles,
    the second electrical conductor of each bundle being electrically connected in parallel to the second electrical conductor of the remaining bundles, and
    the third electrical conductor of each bundle being electrically connected in parallel to the third electrical conductor of the remaining bundles,
wherein
    each bundle is grouped with at least one other bundle, and relative positions of the bundles within the group are maintained by enclosing at least a portion of the bundles within the group with a group wrap, and
    the cable further comprises at least two groups of bundles, and each group is positioned relative to the remaining groups such that so that a net magnetic field generated in response to currents flowing within the cable is zero as seen at a plane oriented transverse to an electrical conduction direction of the cable and located between the first and second ends of the cable.

30. An apparatus comprising a cable that includes a first end, a second end, and a plurality of bundles of electrical conductors,
    each bundle having
        a first insulated electrical conductor,
        a second insulated electrical conductor, and
        a bundle wrap that encloses at least a portion of each of the first and second electrical conductors and maintains the first electrical conductor and the second electrical conductor in respective positions relative to each other within a layered configuration,
    the first electrical conductor of each bundle being electrically connected in parallel to the first electrical conductor of the remaining bundles, and
    the second electrical conductor of each bundle being electrically connected in parallel to the second electrical conductor of the remaining bundles,
wherein
    within each bundle, the first electrical conductor and the second electrical conductor are configured so that a net magnetic field generated in response to currents flowing within the bundle is zero as seen at a plane oriented transverse to an electrical conduction direction of the cable and located between the first and second ends of the cable.

* * * * *